(12) United States Patent
Takashima et al.

(10) Patent No.: US 6,985,960 B2
(45) Date of Patent: Jan. 10, 2006

(54) ROUTING INFORMATION MAPPING DEVICE IN A NETWORK, METHOD THEREOF AND STORAGE MEDIUM

(75) Inventors: Kenya Takashima, Kawasaki (JP); Koji Nakamichi, Kawasaki (JP); Toshio Soumiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 757 days.

(21) Appl. No.: 09/749,479

(22) Filed: Dec. 26, 2000

(65) Prior Publication Data

US 2001/0025319 A1 Sep. 27, 2001

(30) Foreign Application Priority Data

Mar. 27, 2000 (JP) .............................. 2000-085638

(51) Int. Cl.
*G06F 15/16* (2006.01)
*H04L 12/56* (2006.01)
*H04L 12/66* (2006.01)

(52) U.S. Cl. .................... 709/238; 709/245; 709/249; 709/236; 709/230; 370/351; 370/352; 370/353; 370/354; 370/355; 370/356; 370/395.21; 370/395.3; 370/395.31; 370/395.32; 370/395.42; 370/408

(58) Field of Classification Search ............... 709/227, 709/230, 223, 238, 245, 246, 249, 236; 370/60, 370/351–356, 395.2–395.41, 407–409
See application file for complete search history.

(56) References Cited

U.S. PATENT DOCUMENTS 5,251,205 A * 10/1993 Callon et al. ............... 370/392
6,094,525 A * 7/2000 Perlman et al. ............. 709/245

FOREIGN PATENT DOCUMENTS

JP 11068789 3/1999

OTHER PUBLICATIONS

"http://www.pulsewan.com/data101/ospf_basics.htm" Jun. 1999, Open Shortest Path First (OSPF) by Internetworking Techonology Overview. Chapter 42, pp. 1-6.*

* cited by examiner

*Primary Examiner*—Saleh Najjar
*Assistant Examiner*—Benjamin R. Bruckart
(74) *Attorney, Agent, or Firm*—Katten Muchin Rosenman LLP

(57) ABSTRACT

An L bit for notifying another router of whether a self-router belongs to a connection-oriented network is newly provided in the options field of a conventional OSPF packet and the OSPF packet, including L bit is transmitted to another router. In this way, each router belonging a network can automatically recognize a router belonging to a connection-oriented network by detecting L bit. Then, by generating a routing tree, a connection-oriented network device can be identified in the routing tree and mapping between a connection-oriented network and a connectionless network can be performed in an edge device.

24 Claims, 26 Drawing Sheets

| * | O | DC | EA | N/P | MC | E | * |

THE OPTIONS FIELD

F I G. 5 A

| L | O | DC | EA | N/P | MC | E | * |

THE OPTIONS FILED

F I G. 5 B

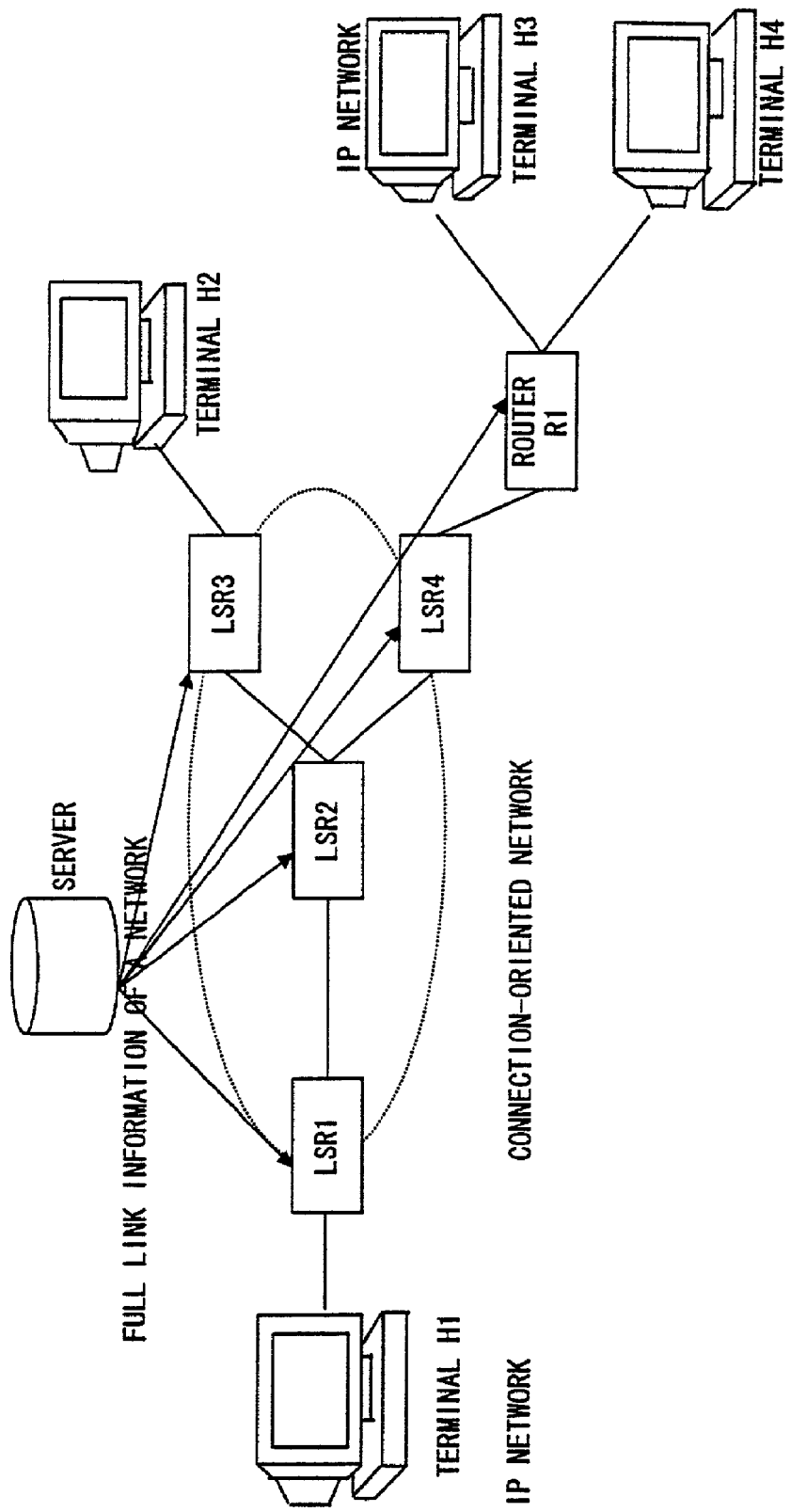
F I G. 6

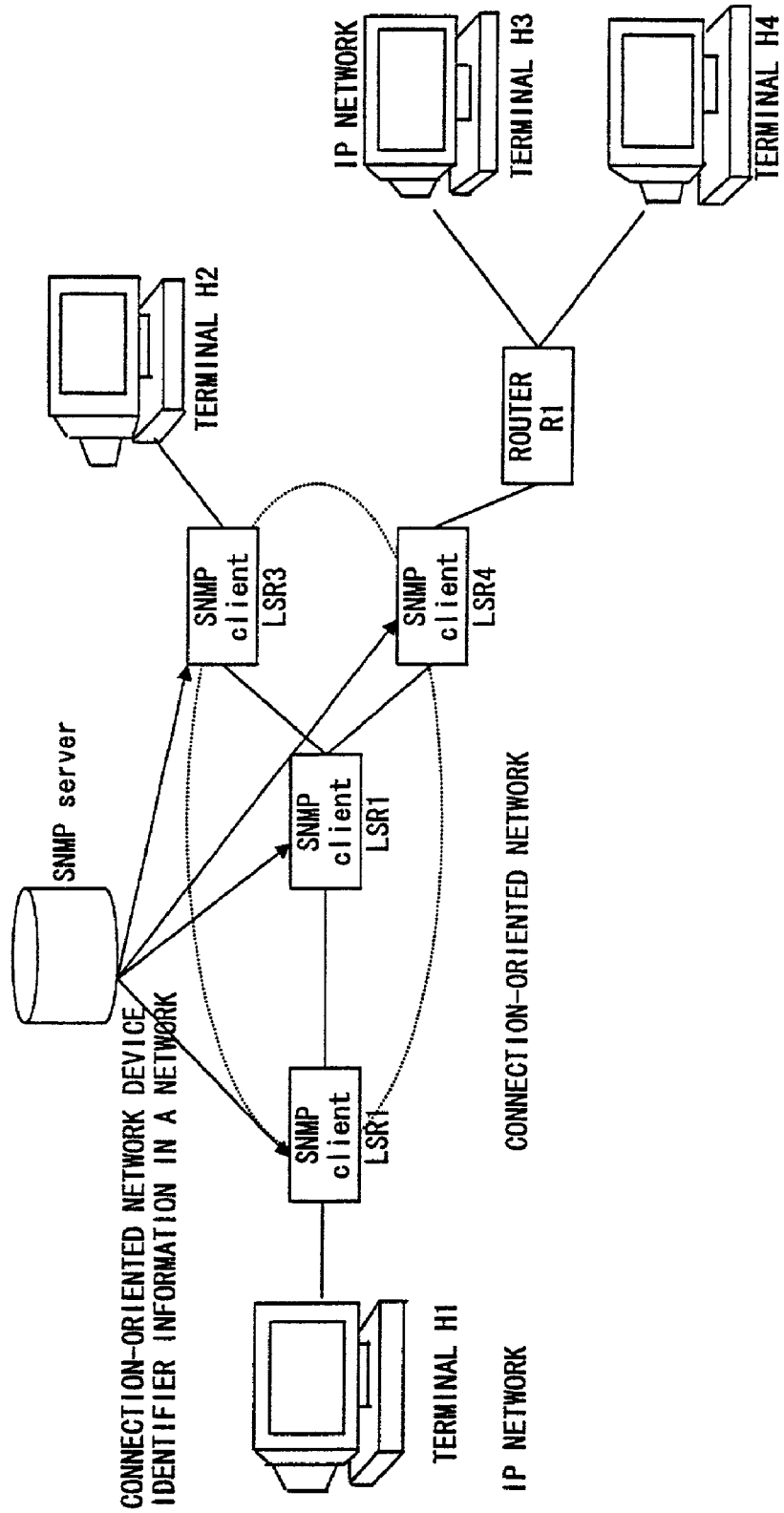
F I G. 7

| * | O | DC | EA | N/P | MC | E | R |

THE OPTIONS FIELD

FIG. 8

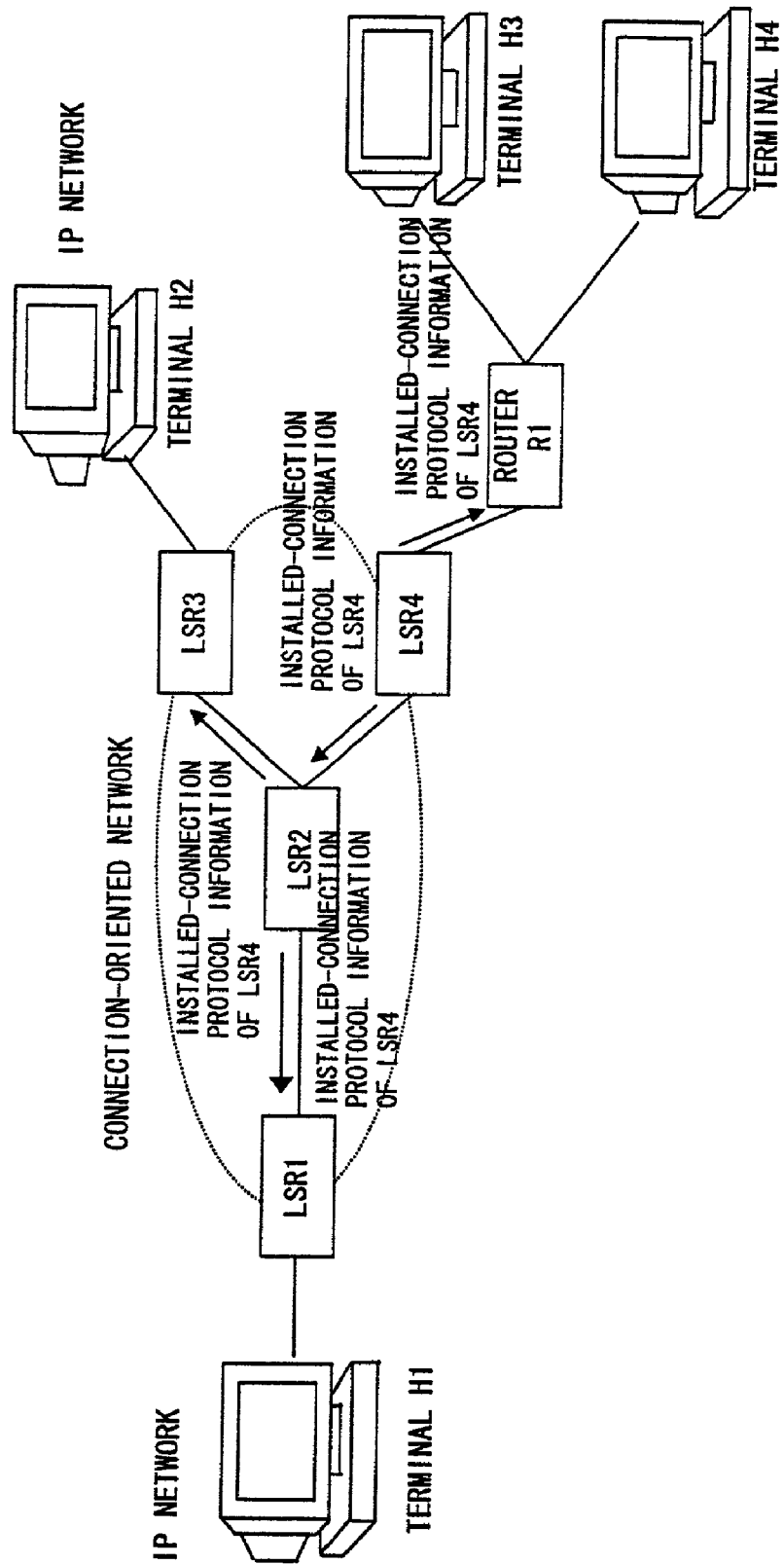
F I G. 9

| DEVICE (INTERFACE) ADDRESS | CONNECTION-ORIENTED NETWORK DEVICE IDENTIFIER | CONNECTION PROTOCOL IDENTIFIER |
|---|---|---|
| 10.0.0.1 | ○ | ○ |
| 10.25.1.1 | ○ | × |
| ... | ... | ... |

F I G. 1 1

```
/*initialization*/
DESIGNATES A SELF-NODE AS THE ROOT OF A TREE.
current_pointer=SELF NODE
/*spf rouine from here*/
spf_routine()
[
    while(1) [
        SEARCHES FOR LINK INFORMATION ADJACENT (RELATED) TO current_pointer
        IF(A NEW ENTRY IS DETECTED.) [
            ADDS THE NEW ENTRY TO THE TREE.
            IF(L/R BITS OF THE LINK INFORAMTION OF AN ENTRY "option header" BOTH ARE ON) [   ...... (1)
                THE DEVICE IS A VALID CONNECTION-ORIENTED NETWORK DEVICE
                (THE INFORMATION IS INTERNALLY STORED).
            }
            current_pointer=NODE OF A NEW ENTRY
        IF(THERE IS NO ENTRY.) [
        current_pointer=ONE-RANK HIGHER NODE
            IF(current_pointer=null) [
                rrturn(0)+ /*THE SEARCH IS COMPLETED. EXITS THE ALGORITHM. */
            }
        }
    }
]
```

F I G. 1 4

```
/*initialization*/
int traced []              /*CHECKS WHETHER ALL POSITIONS ARE CHECKED (CHECKED=1,
UNCHECKED=0)*/
int *current_pointer=LSR1  /*INITIALIZES THE CURRENT POSITION IN THE TREE.*/
char edge_entry []         /*EDGE DEVICE ENTRY*/
int edge_entry_number      /*TOTAL NUMBER OF EDGE DEVICE ENTRIES*/

/*SEARCH ROUTINE*/
search() {
  while(1) {
    VIEWS THE CHILD OF A DEVICE POINTED TO BY current_pointer.
    IF(traced[child]=0) {
      current_pointer=child;  /*MOVES TO AN UNCHECKED CHILD*/
      traced[child]=1;
    }
    ELSE IF(ALL CHILDREN ARE CHECKED.) {
      current_pointer=parent  /*MOVES TO THE PARENT*/
      IF(parent=null) {
        break;               /*THE SEARCH IS COMPLETED.*/
      }
      continue;
    }
    /*JUDGES WHETHER IT IS AN EDGE DEVICE.*/
    IF(L BIT POINTED TO BY current_pointer is zero.) {
      edge_entry[edge_entry_number]=parent DEVICE;
      ++edge_entry_number;
      current_pointer=parent;
    }
  }
  return(0);
}
```

FIG. 15

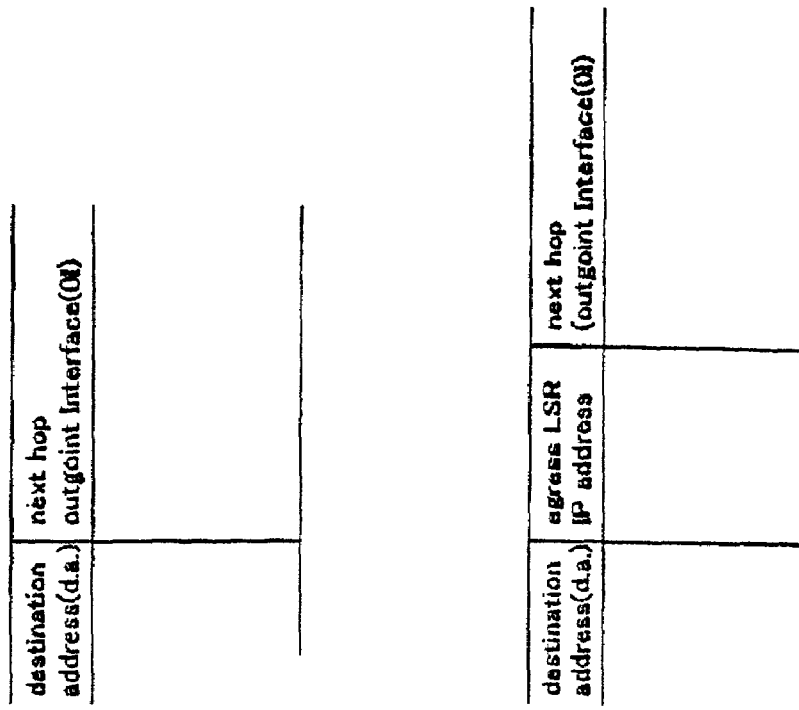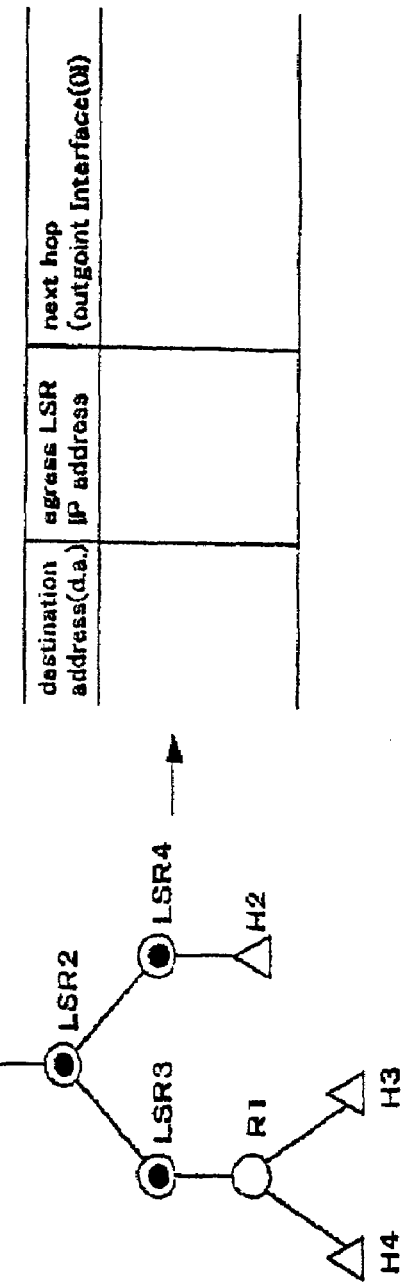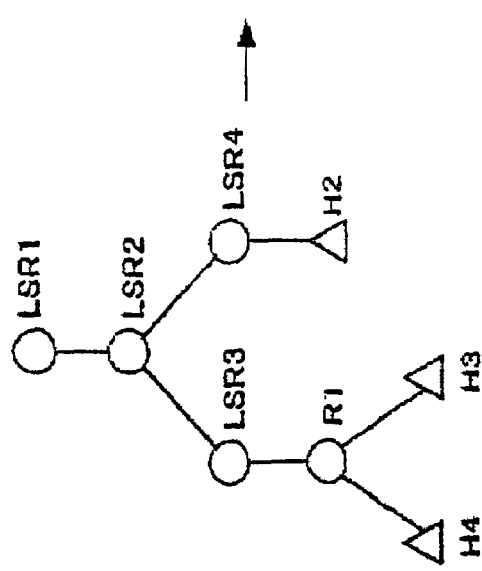
FIG. 18A
FIG. 18B

```
/*initialization*/
int traced []         /*CHECKS WHETHER ALL POSITIONS ARE CHECKED (CHECKED=1,UNCHECKED=0)*/
int *current_pointer=LSR1 /*INITIALIZES THE CURRENT POSITION IN THE TREE.*/
char edge_entry []    /*EDGE DEVICE ENTRY*/
int edge_entry_number /*TOTAL NUMBER OF EDGE DEVIE ENTRIES*/
/*SERCH ROUTINE*/
search() {
  while(1) {
          VIEWS THE child OF A DEVICE POINTED TO BY current_pointer.
          IF(traced[child]=0) {
                  current_pointer=child: /*MOVES TO AN UNCHECKED CHILD.*/
                  traced[child]=1:
          }
  ELSE IF(ALL CHILDREN ARE CHECKED.) {
                  current_pointer=parent /*MOVES TO THE parent/*
                  IF(parent=null) {
                          break;         /*THE SEARCH IS COMPLETED.*/
                  ]
                  continue:
          }

/*JUDGES WHETHER IT IS AN EDGE DEVICE.*/
          IF(L BIT POINTED TO BY current_pointer IS ZERO.) {
                  edge_entry[edge_entry_number]=parent DEVICE:
                  ++edge_entry number;
          }
          /*ADDS AN ENTRY OF A NETWORK CONNECTED TO AN EDGE DEVICE.*/
          IF(L BIT POINTED TO BY current_pointer IS ZERO.) {
                  RELATES THE ip address POINTED TO BY curren_pointer TO
                  edge_entry[edge_entry_number](ENTRY ADDITION):
          ]
  }
  return(0):
}
```

FIG. 19

ENTRY OF EDGE DEVICE/OUTSIDE NETWORK INFORMATION STORED
IN LSR1

| EDGE DEVICE | OUTSIDE NETWORK |
|---|---|
| LSR3 | R1 |
| LSR3 | H4 |
| LSR3 | H3 |
| LSR4 | H2 |

F I G. 2 1 routing_table_request object
    OBJECT INSERTED IN A PATH MESSAGE. IF SENDER(ENTRANCE EDGE DEVICE) WANTS TO OBTAIN THE ROUTING
    TABLE OF AN EXIST EDGE DEVICE, routing_table_request object IS INCLUDED IN THE PATH MESSAGE.

routing_table object
    ON RECEIPT OF THE PATH MESSAGE, INCLUDING THE routing_table_request object, AN EXIT EDGE DEVICE RETURNS
    AN RESV MESSAGE, INCLUDING THE routing_table object, TO THE SENDER. THE file OF THE routing table IS COPIED
    INTO THE routing_table object AND IS TRANSMITTED.

F I G. 2 2

| FEC | | | | | label |
|---|---|---|---|---|---|
| d. a. | s. a. | d. p. | s. p. | proto | |
| 10.0.0.1 | .... | 1000 | .... | .... | 50 |
| 10.0.0.1 | .... | 1050 | .... | .... | 60 |
| 20.0.0.0 | .... | .... | .... | .... | 100 | d. a. =destination IP address,  s. a.=source IP address
d. p. =destination port,  s. p.=source port
proto=protocol ID, ···=no-designation

F I G.  2 5

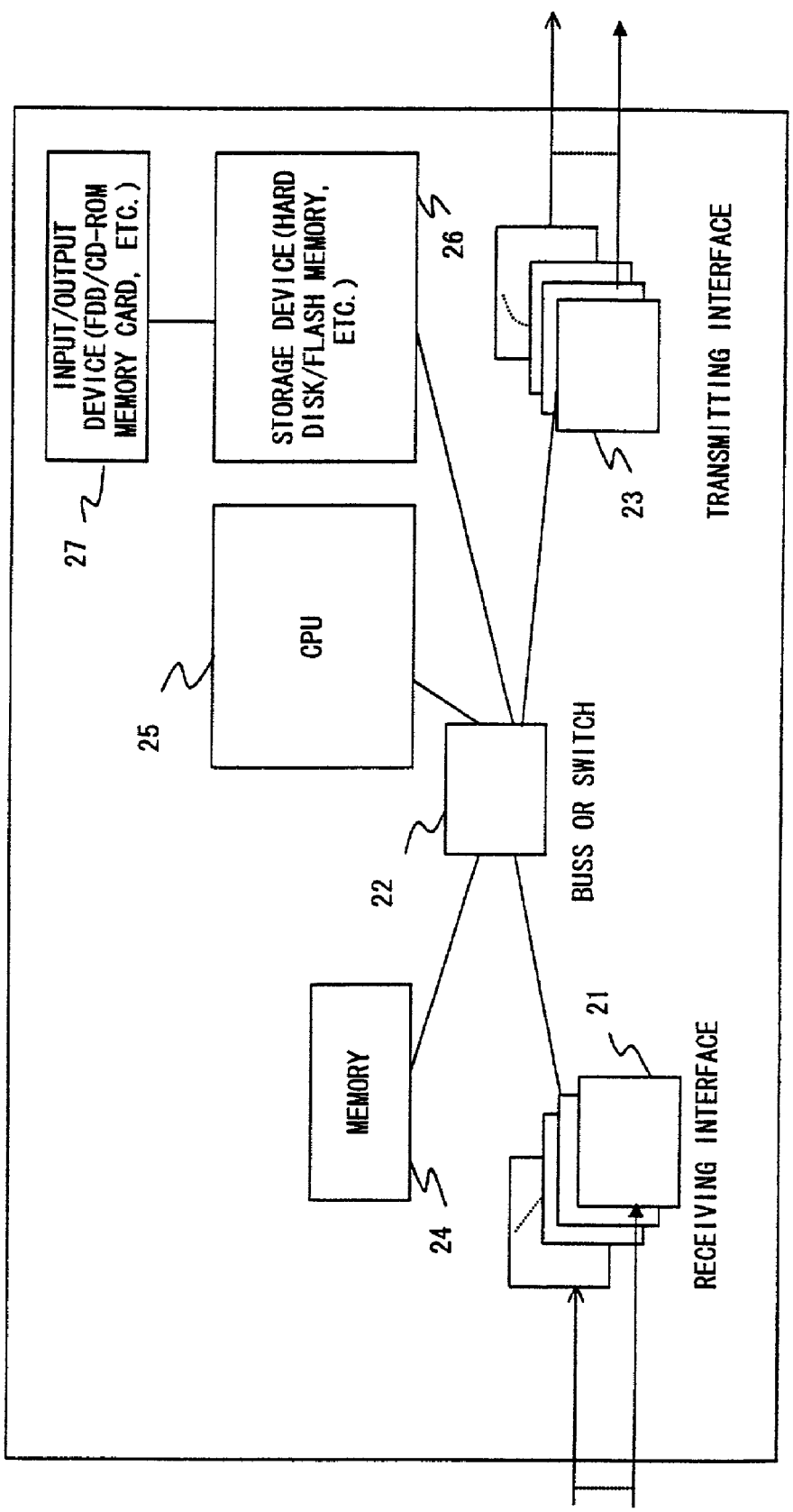
F I G. 26

ROUTING INFORMATION MAPPING DEVICE IN A NETWORK, METHOD THEREOF AND STORAGE MEDIUM

BACKGROUND OF THE INVENTION

1. Field of the Invention

The present invention relates to a routing information mapping device in a network.

2. Description of the Related Art

The standardization of MPLS (Multi-Protocol Label Switching) is currently promoted in an Internet standardization group called IEFT (Internet Engineering Task Force). MPLS is a technology to integrate a connection type network, such as an ATM (Asynchronous Transfer Mode), a frame relay, etc., and an IP (Internet Protocol) network, which is one of the most focussed on technologies in the Internet world.

Historically, MPLS has a close relationship with ATM. The present backbone network of the Internet service provider (ISP) is normally composed of ATM switching equipment and an edge device in an ATM network (edge device between an IP network and an ATM network), that is, a backbone network is a mesh type network, which is operated by manually establishing a PVC (Permanent Virtual Circuit) connection and by manually setting a table for indicating pairs of a PVC and a destination IP address in the network.

In these situations, MPLS for automatically establishing connections has been proposed using the address of an IP packet by providing the ATM switching equipment with a router function and by developing a unique connection establishment protocol that operates on an IP network.

Currently, a traffic engineering system for enabling the sophisticated operation of an MPLS network is discussed as a key application in IETF. The central topic under discussion is the load balancing of traffic in the network.

In order to balance the load, a technology for establishing a plurality of routes between one entrance edge device (entrance device from an IP network to an MPLS network) and one exit edge device (exit device from an MPLS network to an IP network) within an MPLS network is indispensable. This technology is called explicit routing. In order to implement explicit routing, two protocols are currently proposed. One is RSVP LSP-tunneling obtained by extending RSVP (ReSource reservation Protocol), which is the signaling protocol of IETF, and the other is CR-LDP obtained by extending LDP (Label Distribution Protocol), which is the original protocol of MPLS. These protocols establish a connection between an arbitrary entrance edge device and a designated exit edge device.

For more information about RSVP, see RFC2205, Resource Reservation Protocol (RSVP)—Version 1 Functional Specification, which is available at ftp://ftp.isi.edu/-notes/rfc2205.text).

However, it is only protocols that are standardized in IETF and the following problems are not addressed.

(1) How can the entrance edge device detect the IP address of an exit edge device?

(2) How can the IP address be related to the established connection?

Therefore, in reality, automatic load balancing is not possible unless the problems described above are solved.

In the present invention, attention is particularly focussed on an IP routing protocol.

Strictly speaking, the flow of an IP packet is defined by the following set of parameters.

{
destination address prefix,
destination port,
source address,
source port,
protocol ID
}

In load balancing of MPLS, IP packets are handled in bundle of flows larger than that of flows called FEC (Forward Equivalent Class) flows obtained by arbitrarily combining the parameters of a flow. A specific example of FEC is as follows.

FEC{
Destination address prefix,
Source address
}

Load balancing can be implemented by distributing this FEC to a plurality of routes. Although a connection protocol provides a plurality of routes, that is, a plurality of connections, there is no method for relating this FED to the connection. In other words, as long as a mapping method among an FEC and a connection is not established, an automatic load balancing cannot be implemented.

Currently, each vender developing an MPLS router adopts a method for manually generating a mapping table. In a manual setting, the load can be balanced only between two determined points. A great improvement of network performance cannot be expected from such a degree of load balancing.

SUMMARY OF THE INVENTION

It is an object of the present invention to provide a mapping method of information about routing between a connection-oriented network and a connectionless network that is indispensable to the implementation of automatic load balancing in a network.

The routing information mapping device of the present invention comprises transmitting means for transmitting a packet with information about whether a self device belongs to a connection-oriented network, receiving means for extracting both information about whether another device from which a packet is received, belongs to a connection-oriented network and information about the configuration of a network from a packet received from the other device and tree generation means for generating a network routing tree for clearly indicating devices belonging to a connection-oriented network based on the information extracted by the receiving means.

The routing information mapping method of the present invention comprises the steps of (a) transmitting a packet with information about whether a self device belongs to a connection-oriented network, (b) extracting both information about whether another device from which a packet is received, belongs to a connection-oriented network and information about the configuration of a network from a packet received from the other device, and (c) generating a network routing tree for clearly indicating devices belonging to a connection-oriented network based on the information extracted in step (b).

According to the present invention, information about whether a device transmitting a packet belongs to a connection-oriented network is attached to a packet transmitted/received between network devices using a routing protocol or connection protocol and is transmitted to another device.

Therefore, if each device in a network executes this process, all devices in the network can automatically judge devices that belong to a connection-oriented network and devices that do not belong to a connection-oriented network.

By utilizing this function, an edge device in a connection-oriented network can be identified. In the edge device, information about an outside network connected to the connection-oriented network can be collected and routing information for relating connections in a connection-oriented network to an address in an outside network can be mapped.

Therefore, as described above in a paragraph "Description of the Related Art", load can be efficiently balanced in a network by providing routing information mapping means.

BRIEF DESCRIPTIONS OF THE DRAWINGS

FIGS. 5A and 5B show the options field of a PR information field of an OSPF.

FIG. 6 shows how a connection-oriented network device identifier/client-server model transmits link information.

FIG. 7 shows a configuration where an arbitrary device and each connection-oriented network device are designated as a server and an SNMP client, respectively.

FIG. 8 shows how an installed connection protocol identifier is transmitted by a routing protocol.

FIG. 9 shows how connection protocol information is distributed by a routing protocol.

FIG. 11 is a table for registering both information about connection-oriented network devices in a network possessing a server and an installed connection protocol.

FIG. 13 shows what a routing tree looks like.

FIG. 14 shows pseudo-codes indicating a process for generating a routing tree.

FIG. 15 shows pseudo-codes indicating the generation process of a list of connection-oriented network edge devices.

FIGS. 18A and 18B show the difference in function between the OSPF of this preferred embodiment and a conventional OSPF.

FIG. 19 shows pseudo-codes indicating a process for generating the entry of a network connected to an edge device.

FIG. 21 shows an edge device/outside network information entry stored in LSR 1.

FIG. 22 shows new objects defined in this preferred embodiment.

FIG. 25 is an example of the label-FEC table stored in an entrance edge device.

FIG. 26 shows the hardware configuration of a router required when this preferred embodiment of the present invention is implemented by software.

DESCRIPTION OF THE PREFERRED EMBODIMENTS

The present inventions provides a method for performing a fully automatic mapping between an FEC and a connection, transmitting the information to a connection protocol and establishing a plurality of routes required for load balancing utilizing existing Internet routing protocol information, such as OSPF (Open Shortest Path First), which is a protocol for stipulating a method by which routers share a routing protocol. A routing protocol does not require major modifications. It requires only minor modifications, such as adding new identifiers, etc.

In this way, load balancing in an MPLS network can be automated and the addition/deletion of a bypass can be autonomously performed depending on the load situation of an arbitrary link in the network. Therefore, great improvement can be expected in the performance of a network.

For more information about OSPF, see OSPF Version 2, which is available at ftp://ftp.isi.edu/in-notes/rfc2328.text).

For more information about protocol, etc., used in the description of the present invention, see "Internet RFC Dictionary, ISBN4-7561-1888-7 (ASCII Publishing Bureau)".

Figure 1:
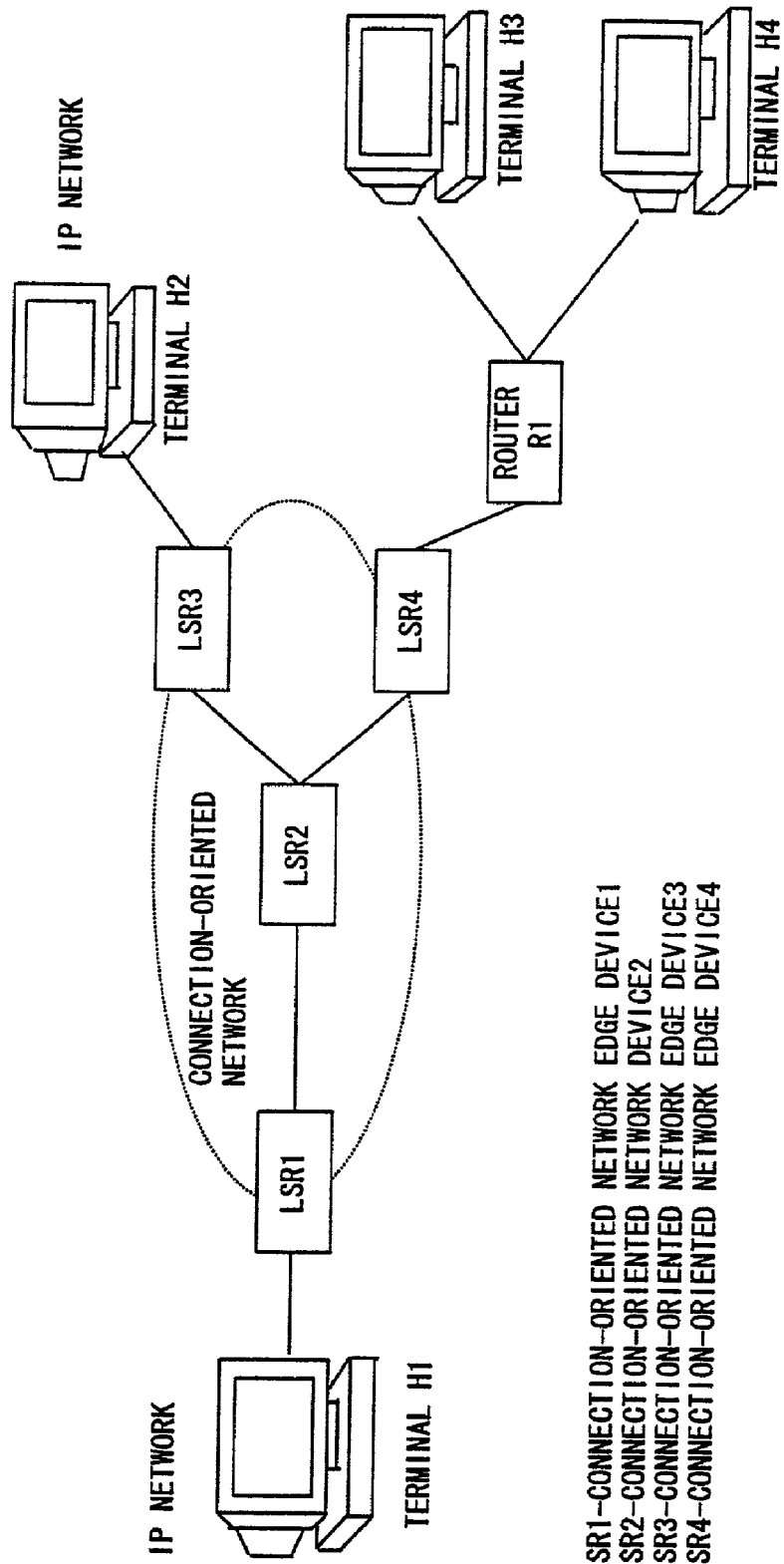
FIG. 1 shows the basic configuration of a network described in this preferred embodiment.

FIG. 1 shows the basic configuration of a network described in this preferred embodiment.

According to the configuration shown in FIG. 1, a connection-oriented network (connection type network, such as an ATM network, etc.) is surrounded by IP networks (connectionless network). Connection-oriented network edge devices are located on the boundary between an IP network and a connection-oriented network and a connection-oriented network device is located within the connection-oriented network. In this example, both the connection-oriented network device and connection-oriented network edge device are the routers of the connection-oriented network.

Terminal H1 is located in an IP network on the left side of FIG. 1, and IP network router R1 and terminals H2, H3 and H4 are located on the right side.

The connection-oriented network device, including an edge device, has the following functions.

An IP router function (IP packet routing/forwarding function)

A high-grade routing protocol

A connection type interface and its control mechanism

A connection protocol

A connection control mechanism

In other words, the connection-oriented network device manages connections established within a connection-oriented network using a connection protocol and simultaneously manages a correspondence table between IP packet information, such as a destination address, etc., and a connection.

The IP network router has the following functions.

An IP Router Function (IP Packet Routing/forwarding Function)

A high-grade Routing Protocol

The terminal has the following functions.

An IP Terminal Function (RFC1122-equivalent)

The following conditions are presumed.

Default Connection

A connection for transferring both the message of a routing protocol and the control message of a connection protocol is located between the connection-oriented network devices. For the connections, it is preferable to prepare connections matching the characteristics of both a routing protocol and a connection protocol, although a point-point connection or point-multipoint connection can be used.

A routing protocol is used to transmit/receive information required to route voice packets, etc., between connection-oriented network devices, routers, etc. A connection protocol is used to actually transmit/receive the voice packets, etc.

Address of a Host Terminal

According to the basic network configuration shown in FIG. 1, neither of terminals H1–H4 is provided with a routing protocol. Therefore, it is presumed that the IP addresses of terminals H1–H4 are registered in the routing table of a router, such as router R1, etc., to which the host of terminals H1–H4 are connected, although the host and routers other than R1 are not shown in FIG. 1.

Routing Protocol

It is presumed that each device (a router, a connection-oriented network device and a connection-oriented network edge device) is provided with a dynamic routing protocol for autonomously solving a routing problem within the network, such as an OSPF standardized by IETF, which is an Internet standardization group.

Figure 2:
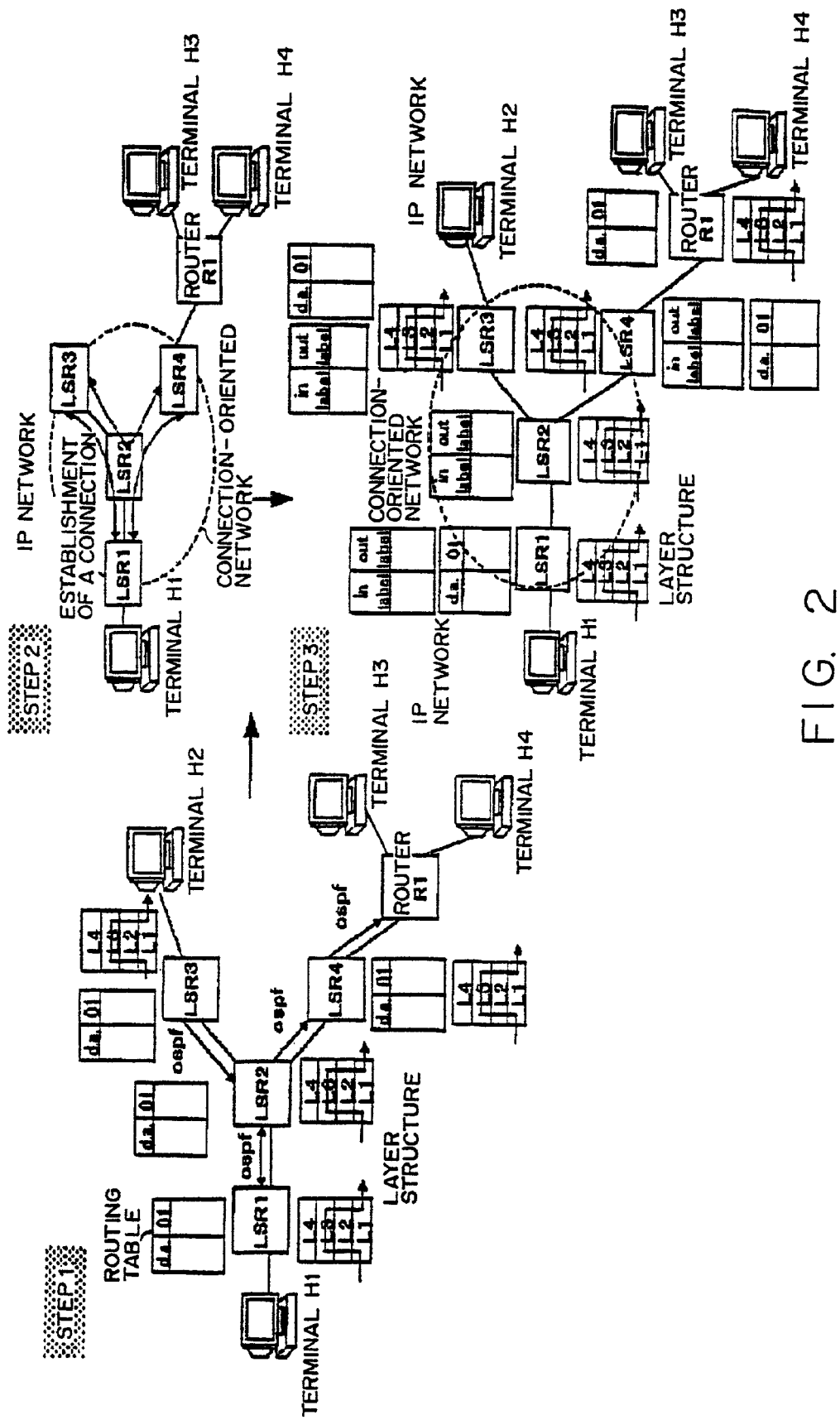
FIG. 2 shows a connection establishment procedure in an MPLS network.

FIG. 2 shows a connection establishment procedure in an MPLS network.

First, in step 1, connection-oriented network devices LSR1–4 and router R1 exchange the contents of routing tables with each other using OSPF, which is a routing protocol, and share the same routing table.

Both the destination address (d.a) of a packet and an outgoing interface (OI) for outputting the packet when the packet is transmitted to a corresponding address are paired and stored in the routing table.

A routing table transmission/reception process by an OSPF in step 1 shown in FIG. 2 belongs to the layer 3 of the layer structure.

Then, in step 2, connections are established among connection-oriented networks LSR1–LSR4 included in the connection-oriented network.

Then, in step 3, each connection-oriented network device stores a label table for indicating how to route an IP packet with both a specific d. a and a specific OI at the level of layer 2 in order to accommodate the IP packet in the connection-oriented network. In this label table, "in label" and "out label" are related and by further relating these in a routing table, a packet is actually routed. Using ATM communications as an example, "in label" corresponds to the VPI/VCP (Virtual Path Identifier/Virtual Channel Identifier) of an input packet and "out label" corresponds to a VPI/VCI used when the packet is outputted. Specifically, "in label" is a connection identifier used when a packet is inputted to a connection-oriented network device, and "out label" is a connection identifier used when the packet is outputted from the connection-oriented network device. A connection can be established by providing each connection-oriented network device with such correspondence in advance.

The label table is used at the level of level 2, and in a connection-oriented network, packets are transferred at the level of layer 2. Therefore, packets are transferred at high speed. However, the transfer of IP packets, etc., is performed by the routing table in layer 3. Therefore, in connection-oriented network devices LSR1, LSR3 and LSR4, the label table and routing table must be related. In this case, for example, if a packet is transmitted from terminal H1 to terminals H2–H4, in LSR1, there is no input connection identifier since the input side is the IP network, which is connectionless. Therefore, in a label table possessed by LSR1, an "in label" column is blank and only "out label" is registered. Conversely, in both LSR3 and LSR4, an "out label" column is blank and only "in label" is registered.

In this way, in an MPLS network, the connection of an IP packet, which is a connectionless packet, is established.

Figure 3:
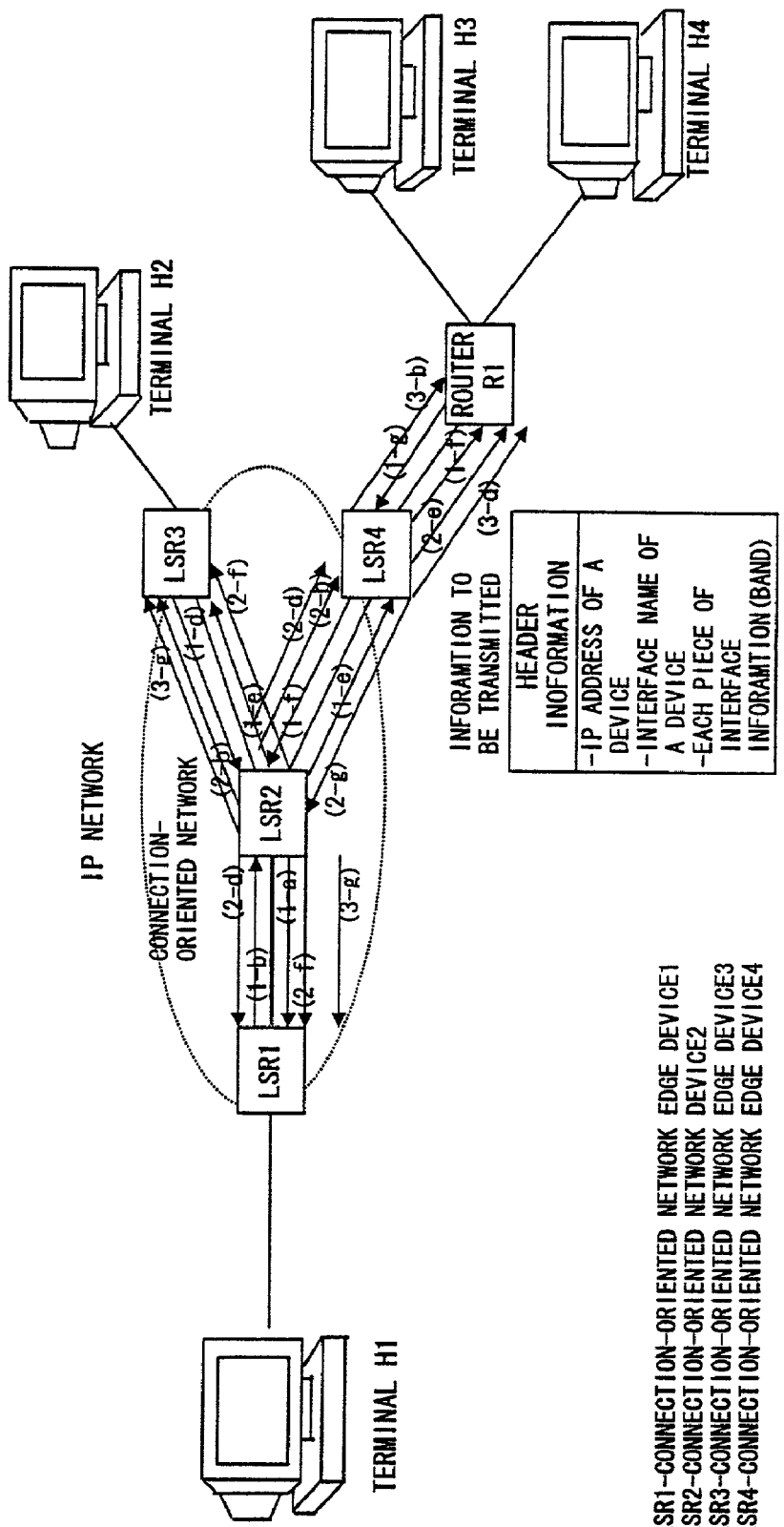
FIG. 3 shows the operation procedure of an OSPF.

FIG. 3 shows the operation procedure of an OSPF.

FIG. 3 shows how a packet based on an OSPF is transmitted/received. When routers LSR1–LSR4 are started (it is assumed that all routers are simultaneously started), the routers exchange respective interface information with one another, which is called "flooding".

A sequence showing the exchange in a packet includes the following operations.

(1) Each router transmits an OSPF message to a neighboring router.

(2) Each router processes the message received from the neighboring router and then transfers the processed message to a subsequent router.

(3) The router transfers a new message to another subsequent router in the same way as in (2).

In the network shown in FIG. 3, the hop (stage) of the farthest router is three. Therefore, after a specific OSPF message is transferred three times, the transfer is terminated. In this way, routing information are synchronized among all the routers. A hop is a unit for connections established between network devices, and a connection made via a plurality of network devices consists of a plurality of hops.

The above procedure is described in detail below. First, an OSPF message transmitted from LSR1 is received by LSR2, as shown in (1-b). LSR2 transfers the OSPF message received from LSR1 to both LSR3 and LSR4, as shown in (2-b). LRS3 terminates the OSPF message. Since LSR4 is connected to router R1, LSR4 transfers the OSPF message to router R1.

The OSPF message transmitted from LSR2 is transmitted to LSR1, LSR3 and LSR4, as shown in (1-a), (1-c) and (1-d), respectively. Both LSR1 and LSR3 terminate the OSPF message. LSR4 transfers the OSPF message received from LSR2 to router R1 (2-e).

The OSPF message received from LSR3 is transmitted to LSR2, as shown in (1-d) and is further transferred to both LSR11 and LSR4, as shown in (2-d). OSR1 terminates the received OSPF message. LSR4 transfers the OSPF message received in (2-d) to router R1 (3-d).

The OSPF message received from LSR4 is transmitted to both router R1 and LSR2, as shown in (1-f). Router R1 terminates the OSPF message. On receipt of the OSPF message from LSR4, LSR2 transfers the OSPF message to both LSR1 and LSR3, as shown in (2-f).

The OSPF message received from router R1 is further transmitted to both LSR4 and LSR2, as shown in (1-g) and (2-g), respectively. LSR2 transfers the received OSPF message to both LSR1 and LSR3, as shown in (3-g).

Next, a method for mapping routing information L3 to connection L2 in an MPLS network is described.

Figure 4:
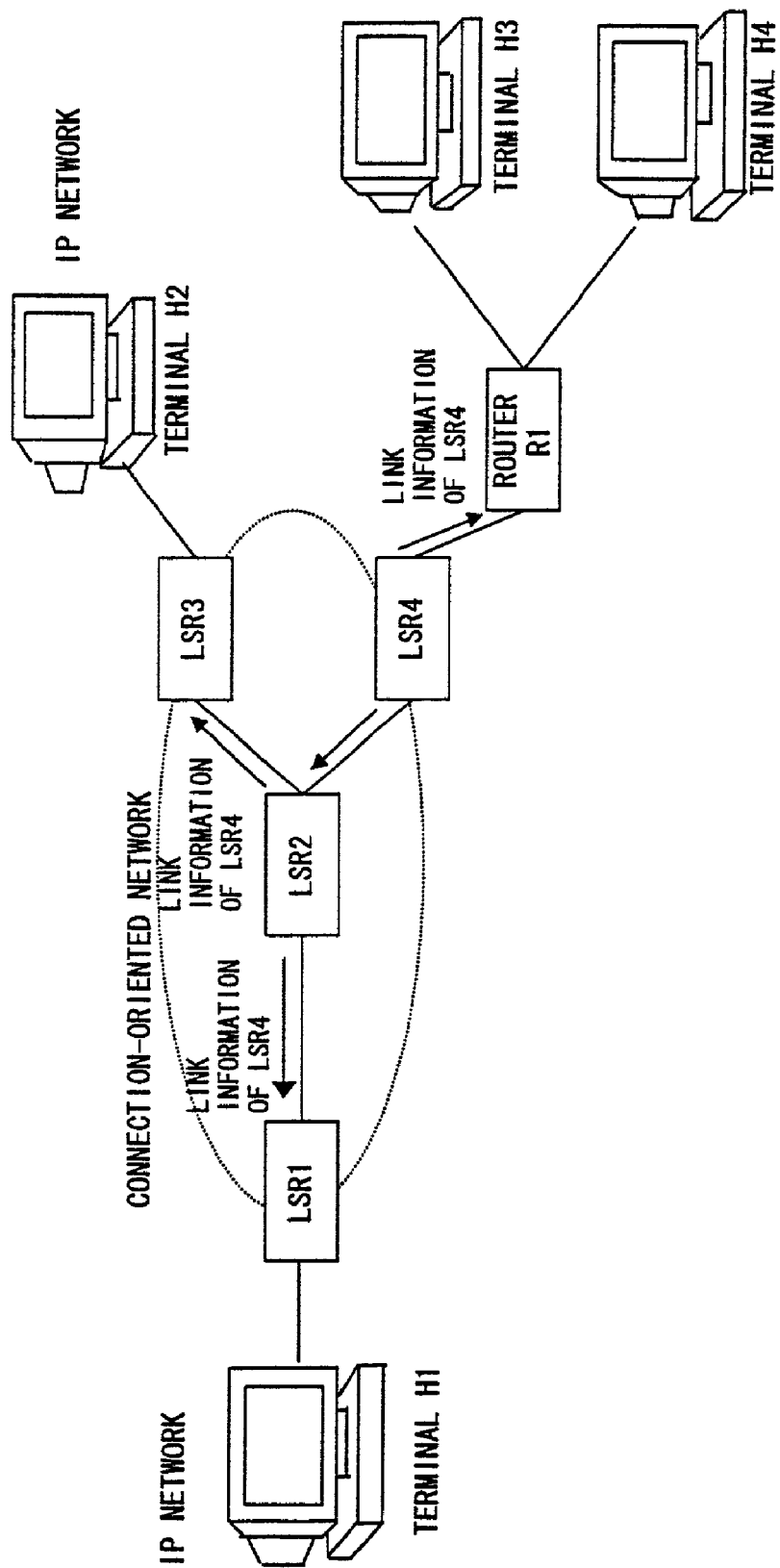
FIG. 4 shows how link information is distributed by a routing protocol.

FIG. 4 shows how link information is distributed by a routing protocol.

If in FIG. 4, terminal H1 communicates with terminal H4, an IP packet is transferred to an IP network→a connection-oriented network→an IP network in that order. Within the IP network, an IP header process is executed for the IP packet for each hop (each router) according to the process procedure of a current router and the IP package is transferred. In the connection-oriented network, the IP packet is transferred through a connection established between two edge devices. Specifically, in the connection-oriented network, the IP header process is not executed and the IP packet is transferred based on the label of the connection-oriented network. Using an ATM network as a connection-oriented network, in the connection-oriented network, the IP packet is transferred based on a label of VPI/VCI in the header of an ATM cell.

This preferred embodiment presumes that each of all the devices is provided with an IP routing protocol. Specifically, it is presumed that both a connection-oriented network device and a connection-oriented network edge device are provided with a protocol of OSPF and an IP routing process is possible. A connection-oriented network is also provided with a connection function. A router provided with an ATM switch function corresponds to this.

Since all devices are the same in terms of a routing protocol and look like the same router, routers belonging to an IP network and routers belonging to a connection-oriented network must be distinguished. Specifically, by notifying the entire network of routers provided with a connection network function, an IP network and a connection-oriented network can be automatically connected.

Since a routing protocol and a connection-oriented network device (MPLS router) are automatically connected in MPLS, each device can automatically distinguish an ordinary router from a connection-oriented network device. In this way, when a routing tree is generated at each node, a network map for indicating devices belonging to an IP network and devices belonging to a connection-oriented network can be generated.

In order for each router to distinguish a device belonging to an IP network from a device belonging to a connection-oriented network, the identifier of a connection-oriented network device is added to a link information exchange packet based on a routing protocol.

The routing protocol broadcasts both a self-interface and connected link information to the entire network. Information about devices belonging to a connection-oriented network can be transmitted across the network by adding a connection-oriented network device identifier to the PR information field.

By reflecting this information on a routing tree composed of devices, information about an entrance edge device, an exit edge device and a network connected to the exit edge device can be obtained.

An OSPF, which is a routing protocol currently mainly used in an AS (Autonomous System) is used as an example. The OSPF exchanges link information between adjacent routers using an LSA object.

FIGS. 5A and 5B show an options field of PR information fields in an OSPF.

As shown in FIG. 5A, an options field has a variety of bits. However, bits at each end of the field are not used.

Therefore, a new bit of L is defined in an unused bit, as shown in FIG. 5B.

L bit: If a self-device is the LSE (Label Switching Router) based on MPLS, this is set to 1. If the self-device is not the LSR based on MPLS, it is set to 0. If an OSPF is not provided with such an extension bit, L bit is not set. However, this is the same as the case where the OSPF is provided with such an extension bit and L bit is automatically set to 0. Therefore, in a router using an OSPF in which L bit cannot be set, it is judged that the self-device is not a connection-oriented network device.

Returning to FIG. 4, the description is continued.

FIG. 4 shows a sequence showing information distribution in case an OSPF is used. FIG. 4 shows how link information generated by LSR 4 is transmitted. The transmission method is the same as the information transmitting method of an OSPF. Each router is provided with an OSPF and transmits link information to a network like LSR4. On receipt of the link information, each router stores a connection-oriented network identifier as a database.

Since necessary information is embedded in a routing protocol in order to map routing information required to automatically balance the load in an MPLS network, automatic load balancing can be easily implemented. Only defining one bit for specifying an identifier is required and, accordingly, the modification of a protocol is seldom required.

FIG. 6 shows how a connection-oriented network device identifier/client-server model transmits link information.

According to the configuration shown in FIG. 6, a server is provided in a network and connection-oriented network device identification information is stored in the server. Each router accesses the server as a client when the router wants to extract such information.

Information can be manually stored in the server by an operator or can be transmitted by a protocol.

An objective of the connection-oriented network device identifier to be stored in the server is to search for a plurality of routes in traffic engineering. In other words, the connection-oriented network device identifier is often used together with a link information database, which is the basic information of a routing search. Therefore, in reality, it is preferable to store the connection-oriented network device identifier in the server together with the routing link information.

FIG. 7 shows a configuration where an arbitrary device and each connection-oriented network device are designated as a server and an SNMP client, respectively.

It is assumed that each device is provided with an SNMP (Simple Network Management Protocol). An SNMP server has the entries of all devices in a network and an entry indicating which client is a connection-oriented network device is inputted in advance by the operator. The SNMP server transmits connection-oriented network device identification information to SNMP clients when each device is started.

Information about both a connection-oriented network and the edge devices can be obtained by the provision of a routing protocol without in any way affecting an existing protocol. If there is an SNMP server in a network, data can be stored in the server. Therefore, the routing protocol can be easily installed. Since information can be collectively managed, maintenance is easy.

Although it is described earlier that explicit routing is required to implement traffic engineering in an MPLS network, a plurality of protocols have been proposed to implement this, and currently, both an RSVP LSP-tunneling and CR-LDP are expected to be standardized. In this case, it is necessary to know the connection protocol of each connection-oriented network device in an MPLS network. This information is transmitted to each connection-oriented network device as an installed connection protocol identifier. Each device can obtain a list of available communications partners in a connection-oriented network by having the installed connection protocol identification information, in addition to the connection-oriented network device identifier information, transmitted in the method described above.

The provision of the function described above is indispensable to link a routing protocol with a connection-oriented network device (MPLS router) in an MPLS network. By the provision, a connection-oriented network device can know available communications partners and the reliable operation of a network can be guaranteed accordingly.

Figure 8:
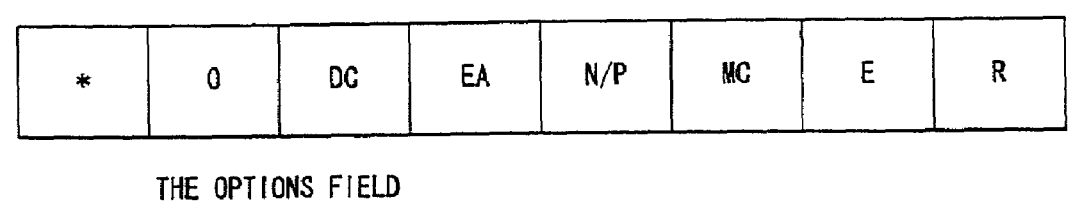

FIG. 8 shows how an installed connection protocol identifier is transmitted by a routing protocol.

In this preferred embodiment, a connection protocol identifier installed in each device is added to a link information exchange packet by the routing protocol.

A connection protocol identifier is embedded in information exchanged by the routing protocol. In this example, a case using OSPF is used as an example. For example, it is assumed that one bit of the options field (8 bits) of OSPF is used. Of 8 bits, bit 7 at the right end is defined as R bit.

R bit: If a self-device is an LDS provided with RSVP LSP-tunneling, this is set to 1. If RSVP LSP-tunneling does not operate in the self-device, this is set to 0. If there is an OSPF without this extension, this is automatically set to 0 and the self-device is judged to be a device in which RSVP LSP-tunneling does not operate.

In this way, by embedding a connection protocol identifier, connection protocol information is automatically transmitted to a network when OSPF exchanges link information.

Since necessary information is embedded in the routing protocol when routing information required to automatically balance the load in an MPLS network, is mapped, an installed connection protocol identifier can be easily added. Only defining one bit for specifying an identifier is required and, accordingly, the modification of a protocol is seldom required.

FIG. 9 shows how connection protocol information is distributed by a routing protocol.

FIG. 9 shows how connection protocol information is transmitted from LSR4 to each network device. As described above, LSR 4 sets R bit in the options field of OSPF and transmits the information to both routers R1 and LSR2. In this way, both routers R1 and LSR2 can detect a connection protocol provided in LSR4.

LRS2 transfers the information received from LSR4 to both LSR1 and LSR3 without modifications. Therefore, both LSR1 and LSR3 can detect the set value of R bit from LSR4 and can also detect a connection protocol installed in LSR4.

Figure 10:
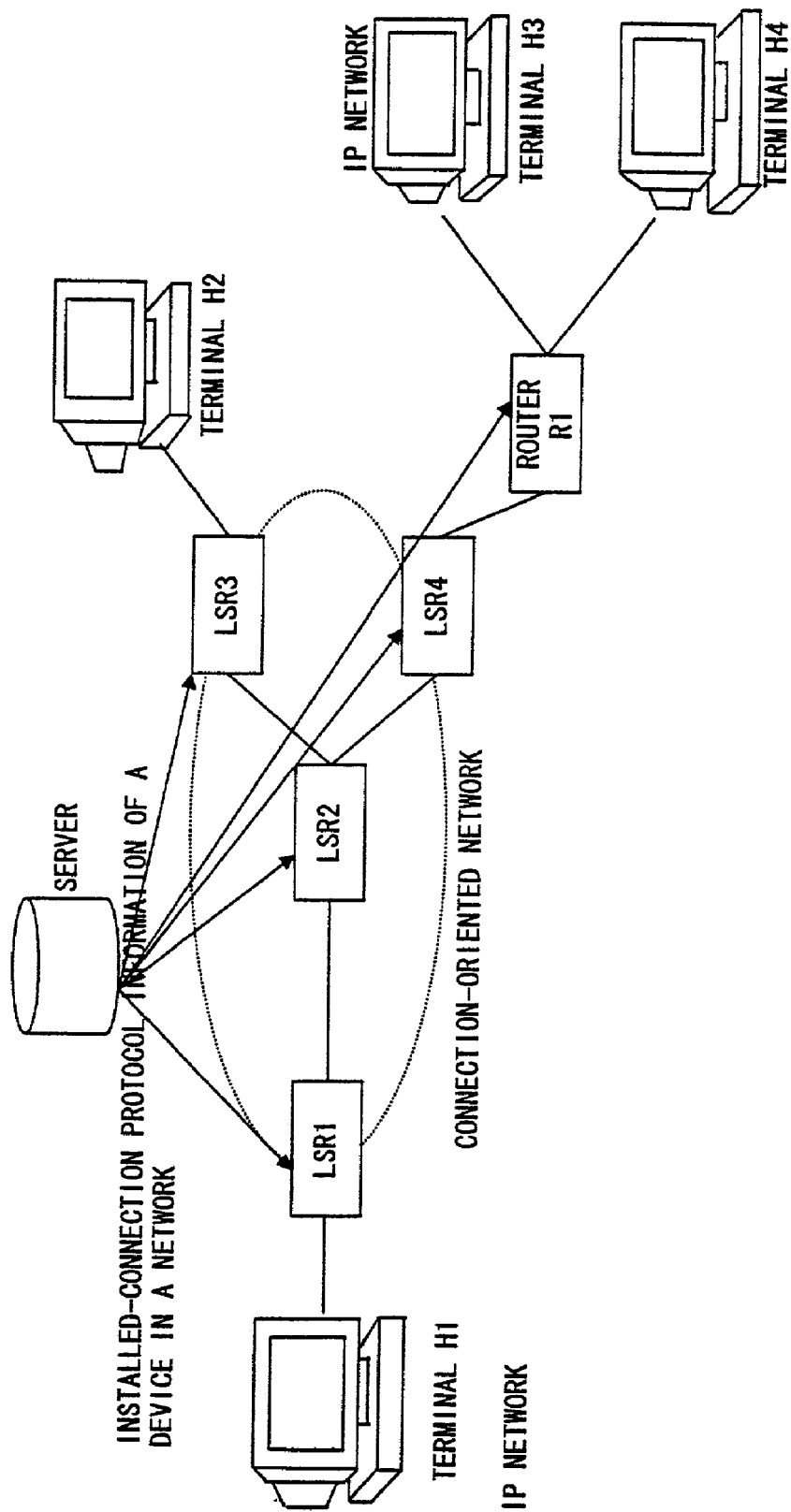
FIG. 10 shows how a client-server model transmits an installed connection protocol identifier.

FIG. 10 shows how a client-server model transmits an installed connection protocol identifier.

A server is provided in a network and connection-oriented network device identification information is stored in the server. Each router accesses the server as a client when the router wants to extract the information.

Information can be manually stored in the server by an operator or can be transmitted by a protocol.

An objective of the connection-oriented network device identifier to be stored in the server is to search for a plurality of routes in traffic engineering. In other words, the connection-oriented network device identifier is often used together with a link information database, which is the basic information of a routing search. Therefore, in reality, it is preferable to store the connection-oriented network device identifier in the server together with the routing link information.

FIG. 10 shows a configuration where an arbitrary device and each connection-oriented network device are designated as a server and an SNMP client, respectively.

It is assumed that each device is provided with SNMP (Simple Network Management Protocol). An SNMP server has the entries of all devices in a network and an entry indicating which client is a connection-oriented network device is inputted in advance by the operator. The SNMP server transmits connection-oriented network device identification information to an SNMP client when each device is started. In this way, a table, as shown in FIG. 11, can be generated and available communications partners can be detected by explicit routing.

FIG. 11 is a table for registering both information about connection-oriented network devices in a network possessing a server and an installed connection protocol.

In the table shown in FIG. 11, the address of each device is registered, and both the detected value of a connection-oriented network device identifier (L bit) and the detected value of a connection protocol identifier (R bit) are registered in a device specified by each address.

Therefore, according to FIG. 11, it is detected that a device with an address of 10.0.0.1 is a connection-oriented network device, and the device is provided with RSVP LSP-tunneling. It is also detected that a device with an address of 10.25.1.1 is a connection-oriented device but the device is not provided with RSVP LSP-tunneling.

The connection protocol installation method described in FIGS. 10 and 11 can obtain information about a connection-oriented network and edge devices without in any way affecting an existing protocol. If there is an SNMP server in a network, data can be stored in the server. Therefore, a connection protocol can be easily installed. Since information can be collectively managed, maintenance is easy.

Figure 12:
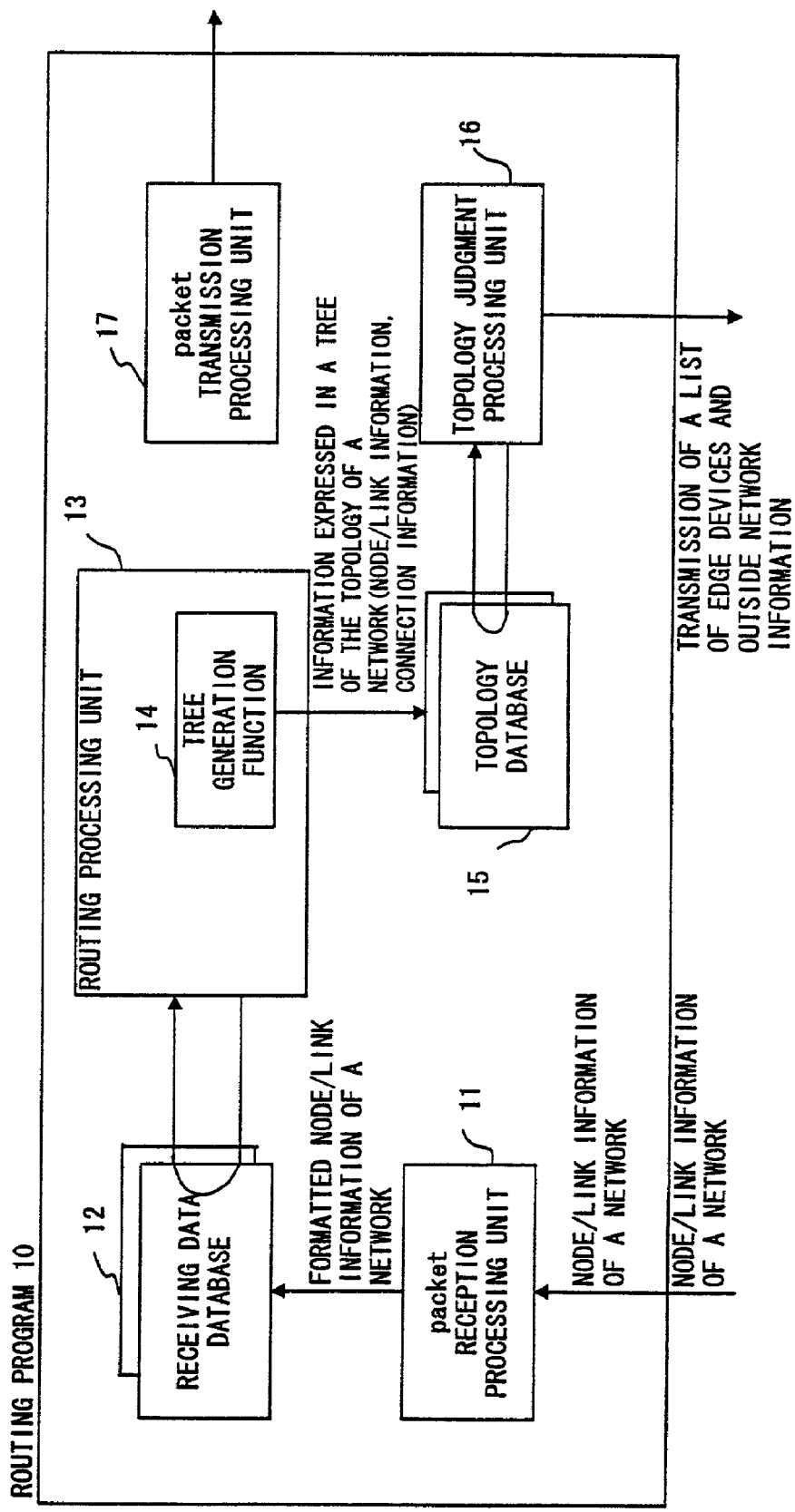
FIG. 12 shows the functional configuration related to this preferred embodiment of a connection-oriented network device.

FIG. 12 shows the functional configuration related to this preferred embodiment of a connection-oriented network device.

Each connection-oriented network device is provided with a routing protocol 10. The routing protocol 10 has the following functional blocks.

Specifically, the routing protocol 10 comprises a packet reception-processing unit 11 for receiving a routing packet (OSPF packet) with the node/link information of a network from outside and processing the packet in such a way to be registered in a database. The packet reception-processing unit 11 obtains node/link information and L/R bit information from the received routing packet (OSPF packet) and format-processes the information in such a way to be stored in the database. Then, the packet reception-processing unit 11 transmits both the node/link information and L/R bit information of the network to the receiving data database 12. The receiving data database 12 stores both the received node (router)/link information and L/R bit information of the network.

A routing processing unit 13 has a routing function to determine the route of a packet. The routing processing unit 13 is provided with a tree generation function 14 to generate tree information about routes from a self-router to all points as an additional function. Tree information generated by the tree generation function 14 is passed to a topology database 15. The tree information generation method is described later.

The topology database 15 stores tree information generated in a routing process. The topology database 15 has information about the destination/route of a packet and connection-oriented network (MPLS network) part in a network.

A topology judgment-processing unit 16 has a process function to extract both a list of edge devices and outside network information from the generated topology database. The information extracted by the topology judgment-processing unit 16 is passed to a connection-processing unit for processing connections in the device.

A packet transmission-processing unit 17 generates OSPF packets according to an OSPF, which is a routing program, and transmits the packets to another router, etc. In this preferred embodiment, at this time, L/R bits are set in the options field of the OSPF packet. However, all routers do not have the L/R bit-setting function of the packet transmission-processing unit 17. L/R bits cannot be set in OSPF packets transmitted from routers without this function. In this case, it is judged on the receiving side that L and R bits of the OSPF packets transmitted from a router without the L/R bit setting function are set to 0.

Next, the generation method of a routing tree for a connection-oriented network device is described.

Both the connection-oriented network device identifier information and connection protocol identification information that are obtained by the methods described above with reference to FIGS. 4–11 are added to the routing link information, and a routing tree is generated based on the link information to which two pieces of identification information are added.

Figure 13:
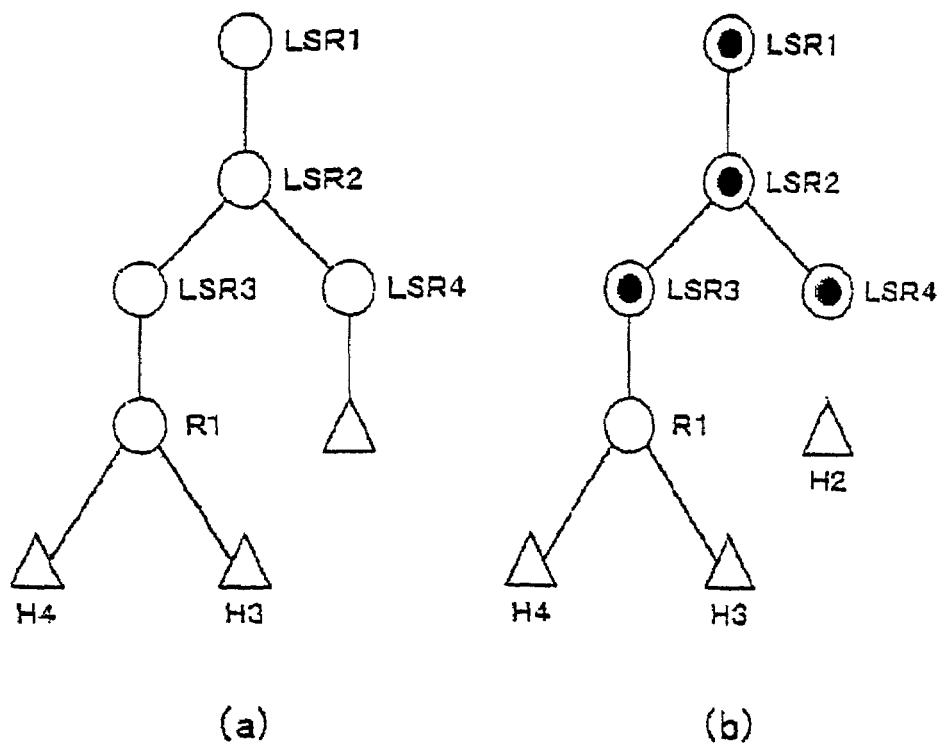

FIG. 13 shows what a routing tree look like.

FIG. 13(a) shows the routing tree of LSR1 according to a conventional system. FIG. 13(b) shows the routing tree of LSR1 according to this preferred embodiment.

As shown in FIG. 13(a), conventionally, a connection-oriented network device cannot be distinguished from an IP router with in one routing area. No installed connection protocol information is provided. Therefore, a router (LSR1) cannot judge which device is an edge device.

However, as shown in FIG. 13(b), according to the routing tree of this preferred embodiment, if the bits of both a connection-oriented network device identifier and a connection protocol identifier are ON, the router (in the case of FIG. 13(b), LSR1–LSR4) can be indicated with a double circle with a black inner circle, as shown in FIG. 13(b), and the router can be judged to be a connection-oriented network device, communications with which are available.

As shown in FIG. 13(b), it can be judged from a routing tree generated according to this preferred embodiment which devices compose a connection-oriented network and which devices are edge devices.

FIG. 14 shows pseudo-codes indicating a process for generating a routing tree.

According to OSPF, the SPF (Shortest Path First) algorithm (an algorithm for implementing OSPF) operates based on link information and a routing tree with a self-device as a root is generated. In the process, the cost of each destination can also be calculated. A device to be noted is indicated with a current pointer.

Entries are sequentially searched for toward the bottom. If there is no entry (the tip of the tree is reached), one step back is taken and entries are sequentially searched for toward the bottom again. When a new entry is detected ((1) in the routine), both a connection-oriented network device identifier (L bit) and a connection protocol identifier (R bit) are checked. If the bits of both the identifiers are raised, the device is judged to be a valid connection-oriented network device.

Next, the pseudo-codes are described. First, in FIG. 14, in an initialization step, a self-node is designated as a root. A current pointer is set in a self-device. Then, an SPF routine is executed. The following process is repeated using a sentence beginning with "while".

First, link information adjacent to (related to) the current pointer is searched for and obtained from an OSPF LSA (Link State Advertisement) database, which is a database corresponding to the receiving data database shown in FIG. 12 and storing data to be transmitted to a neighboring router.

Then, it is judged whether there is a new entry, using a sentence beginning with "if". If there is a new entry, the new entry is added to the tree. Then, it is checked whether the L and R bits of the option header (field) of the link information of the entry both are 0. If the L and R bits both are 0, a device corresponding to the new entry is judged to be a valid connection-oriented network device, the information is stored and the current pointer is set in the node of the new entry. If either the L or R bit is not ON or if neither the L nor R bit is ON, the current pointer is simply set in the node of the new entry.

Then, it is judged whether there is still an entry, using an "if" sentence. If there is an entry, the process returns to the beginning of the "while" sentence, and the same process is repeated. If there is no entry, the current pointer is set in the one rank-higher node and then it is judged whether the current pointer becomes null, specifically it is judged whether there is one rank-higher node, using an "if" sentence. If there is a one rank-higher node, the process returns to the beginning of the "while" sentence and the same process is repeated. If there is no one rank-higher node, it is judged that all nodes are checked and the process is terminated without returning to the "while" sentence.

According to the preferred embodiment described above, a network topology map can be efficiently drawn using the mechanism of a routing protocol.

Next, the method for distinguishing an edge device from other devices is described.

Which device is a connection-oriented network edge device is judged based on the routing tree obtained in the preferred embodiment described above. As described earlier, in order to perform traffic engineering, an arbitrary connection-oriented network edge device must obtain the addresses of all other edge devices. A specific connection-oriented network edge device detects an edge device according to the following rules based on the routing tree obtained in the preferred embodiment described above.

A part of the tree where devices, the connection-oriented network device identifier bit (L bit) of which is raised (is ON) in the tree, continue, is judged to be a connection-oriented network.

If even one connection-oriented network device identifier bit (L bit) of a branch connected to the focussed node in a specific position of the tree is OFF, a device in the position is registered as an edge device.

Each edge device obtains a list of connection-oriented network edge devices according to these rules.

FIG. 15 shows pseudo-codes indicating the generation process of a list of connection-oriented network edge devices.

Figure 16:
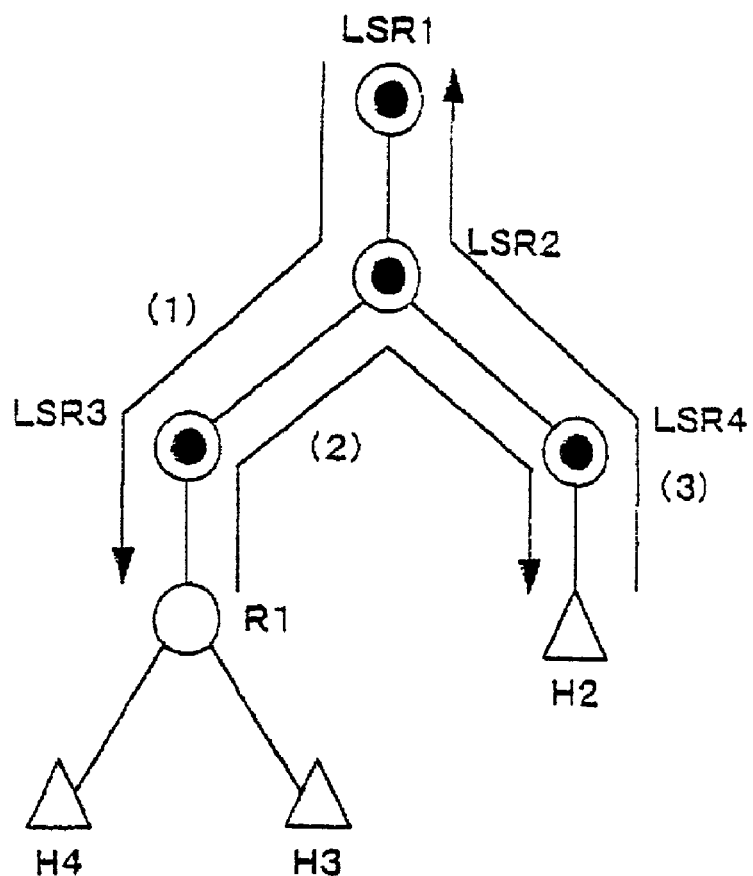
FIG. 16 shows the concept of the generation process of a list of connection-oriented network edge devices.

FIG. 16 shows the concept of the generation process of a list of connection-oriented network edge devices.

Figure 17:
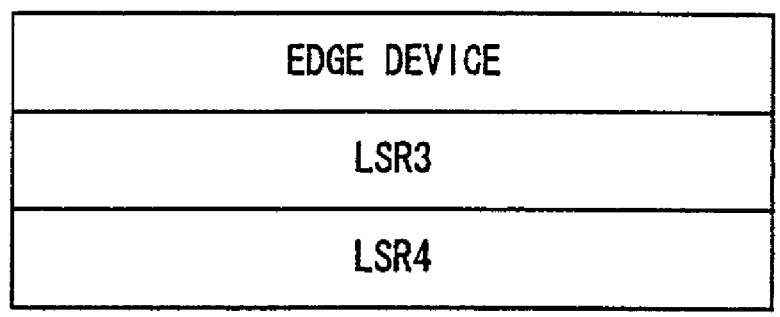
FIG. 17 shows an example of an edge device entry stored in LSR 1.

Furthermore, FIG. 17 shows an example of an edge device entry stored in LSR 1.

In this example, a list stored in a connection-oriented network edge device LSR1 is generated. It is assumed that LSR1 is provided with the tree generated in the preferred embodiment described above. The list is obtained in the sequence (1)–(3) shown in FIG. 16 based on the tree according to the algorithm shown in FIG. 15. A branch connected below a specific position in the tree is called a "child" and a trunk connected above the specific position is called a "parent". In any position there are one parent and either no children or any number of children.

In the example shown in FIG. 16, this algorithm operates as follows.
(1) This algorithm starts from LSR1 and searches downwards. The algorithm moves from LSR1, to LSR2, to LSR3, in that order, and reaches R1, the L bit of which is OFF. At this time, it is detected that the parent of R1, that is, LSR3 is a connection-oriented network edge device. LSR3 is added to an edge device entry.
(2) The algorithm returns toward the trunk, to LSR3, to LSR2, in that order, and moves to the right part that is not been checked, to LSR2, to LSR4, in that order and reaches H2, the L bit of which is OFF. At this time, it is detected that LSR4, which is the parent of H2, is a connection-oriented network edge device. LSR4 is added to the edge device entry.
(3) The algorithm returns toward the trunk, from H2, to LSR4, to LSR2, to LSR1. Since all devices are checked here, the process is terminated.

Finally, the list shown in FIG. 17 of an edge device entry stored in LSR1 is obtained.

The pseudo-codes shown in FIG. 15 are described below.

First, in an initialization step, an identification flag "traced[ ]" about whether each node in each position is checked (checked =1, unchecked=0) is prepared, the current position in the tree "current pointer" is set in LSR1, the array of edge device entry "edge_entry[ ]" is provided and a variable indicating the total number of edge device entries "edge_entry number" is provided.

Then, a search routine starts. First, information about the child of a device pointed to by the current pointer is viewed in a "while" sentence. Then, in an "if" sentence it is judged whether the current child is already checked. If the child is unchecked, the current pointer is set to the child and the flag "traced" of the child is set to 1. If the current child is already checked, in a subsequent sentence beginning with "else if" it is judged whether all children are already checked. If all children are already checked, the current pointer is set in a parent and in a subsequent "if" sentence it is judged whether the parent is null. If the parent is null, it is judged that the search is completed and the process is terminated without returning to the "while" sentence. If the parent is not null, the process returns to the beginning of the "while" sentence and the same process is repeated.

If all children are unchecked, in an "if" sentence it is judged whether L bit pointed to by the current pointer is 0. If the L bit is not 0, the process returns to the beginning of the "while" sentence and the same process is repeated. If the L bit is 0, it means that the parent of a node pointed to by the current pointer is an edge device. Therefore, an identifier indicating the parent device is set in the array "edge_entry" with a number indicated by "edge_entry number". Then, "edge_entry number" is incremented by one, the current pointer is set in the parent, returns to the beginning of the "while" sentence and the same process is repeated.

FIGS. 18A and 18B show the difference in function between the OSPF of this preferred embodiment and a conventional OSPF.

FIG. 18A shows the image of a routing tree according to a conventional OSPF and the entry content of a routing table possessed by each router.

FIG. 18B shows the image of a routing tree according to this preferred embodiment and the entry content of a routing table possessed by each router.

As known from the comparison between FIGS. 18A and 18B, in this preferred embodiment, the IP address of an edge device is detected according to the preferred embodiment described earlier. Therefore, this address is stored in relation to both a destination address and an OI. As shown in FIG. 18B, it can be detected which router is an edge device and which range a connection-oriented network covers.

Next, both the generation method of outside network information in an edge device and the generation method of exit edge device-outside edge device network information are described.

Connection-oriented network exit edge devices are identified from a routing tree to which connection-oriented network device identifier information is added, a list of devices existing in an IP network connected to the exit edge device is obtained and a correspondence table between an exit edge device and FEC is generated.

According to the preferred embodiment described above, full information required for the traffic engineering of MPLS can be obtained by relating information about a network connected to the edge devices in the obtained edge device entry to the edge devices. In particular, from the viewpoint of traffic engineering load balancing, if an entrance edge device can automatically obtain exit edge device information corresponding to the destination in the header of an IP packet, fully autonomous load balancing of a network can be implemented.

FIG. 19 shows pseudo-codes indicating a process for generating the entry of a network connected to an edge device.

Figure 20:
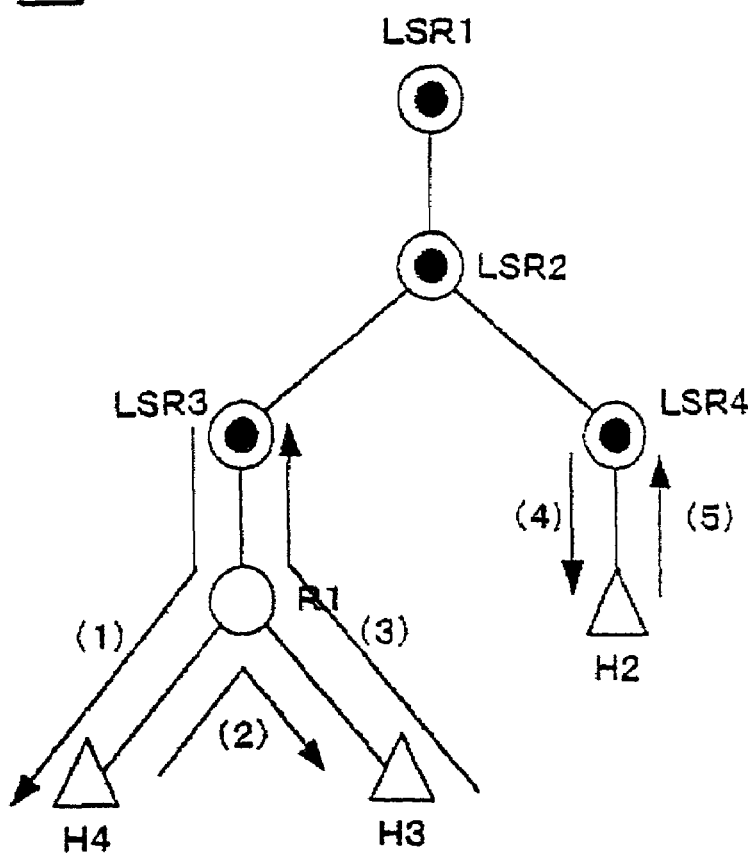
FIG. 20 shows the concept of the generation process of outside network information in an edge device.

FIG. 20 shows the concept of the generation process of outside network information in an edge device.

Furthermore, FIG. 21 shows an edge device/outside network information entry stored in LSR 1.

In the example shown in FIG. 20, this algorithm operates as follows.
(1), (2) and (3): This algorithm starts from LSR3 and searches downwards, to R1, to H4, to R1, to H3, in that order. Since L bits of R1, H4 and H3 are all OFF, R1, H4 and H3 are registered as devices connected to LSR3. (4) and (5): Similarly, H2 is registered as a device connected to LSR4.

Finally, the list shown in FIG. 21 is obtained as an edge device entry stored in LSR1.

The pseudo-codes shown in FIG. 19 are described below.

First, in an initialization step, flag "traced[ ]" about whether a node in each position is checked is set. This flag is set to 1 if each node is checked, and it is set to 0 if each node is unchecked. A current pointer is also set in LSR1 (in this preferred embodiment, the description is given using LSR1 as a root). Array "edge_entry[ ]" for storing an edge device entry is also provided. Furthermore, a variable "edge_entry number" for storing the total number of edge device entries is prepared.

In a search routine, first, in a "while" sentence, the child of a device pointed to by the current pointer is viewed. In an "if" sentence it is judged whether the child is already checked. If the child is unchecked, the current pointer is set to the child (the current pointer is shifted to an unchecked child) and the flag of the child is set to 1. If the child is already checked, in an "if" sentence it is judged whether all children are already checked. If all children are unchecked, the process returns to the beginning of the "while" sentence and the same process is repeated. If all children are already checked, the current pointer is set to a parent and it is judged whether the parent is null. If the parent is null, it is judged that the search is completed and the process is terminated without returning to the "while" sentence. If the parent is not null, the process returns to the beginning of the "while" sentence and the same process is repeated.

If the child is unchecked, in an "if" sentence it is judged whether L bit pointed to by the current pointer is 0. If L bit is 0, a parent device is set to the "edge_entry number"-th array "edge_entry" and "edge entry number" is incremented by one. Then, in an "if" sentence it is judged whether L bit pointed to by the current pointer is 0. If L bit is not 0, an IP address pointed to by the current pointer is related to "edge entry[edge_entry number]" and the child is added to the entry. Then, the process returns to the beginning of the "while" sentence and the same process is repeated.

Next, the transmission method of connection-oriented network exit edge device routing information by a connection protocol is described.

In the preferred embodiment described above, the description is given assuming that network link information is distributed by a stored routing protocol. How to generate the same entry as in the preferred embodiment described above if each device cannot obtain link information about the entire network is described below.

First, it is assumed that an arbitrary connection-oriented network edge device has the entry of another connection-oriented network edge device. A connection protocol can operate between an entrance connection-oriented network edge device and an exit connection-oriented edge device based on this information. When a connection is established between an entrance device and an exit device by a connection protocol, a routing table stored in the routing protocol of an exit edge device is transmitted from the exit device to the entrance device by piggybacking the routing table on the connection protocol. In this way, an edge device/outside network information entry can be made.

An example of the case using RSVP as a connection protocol is shown.

FIG. 22 shows new objects defined in this preferred embodiment.

In this example, both a "routing table request" object and a "routing table" object are defined.

The "routing table request" object is an object inserted in a PATH message (RSVP transmitting message). If a source device (entrance edge device) wants to obtain the routing table entry of an exit edge device, the source device includes a "routing table request" object in the PATH message.

On receipt of the PATH message, including the "routing table request" object, the exit edge device returns an RESV message (RSVP reply message), including the "routing table" object, to the sender of the routing table request. In this case, the file of the routing table is copied into the "routing table" object and is transferred.

Figure 23:
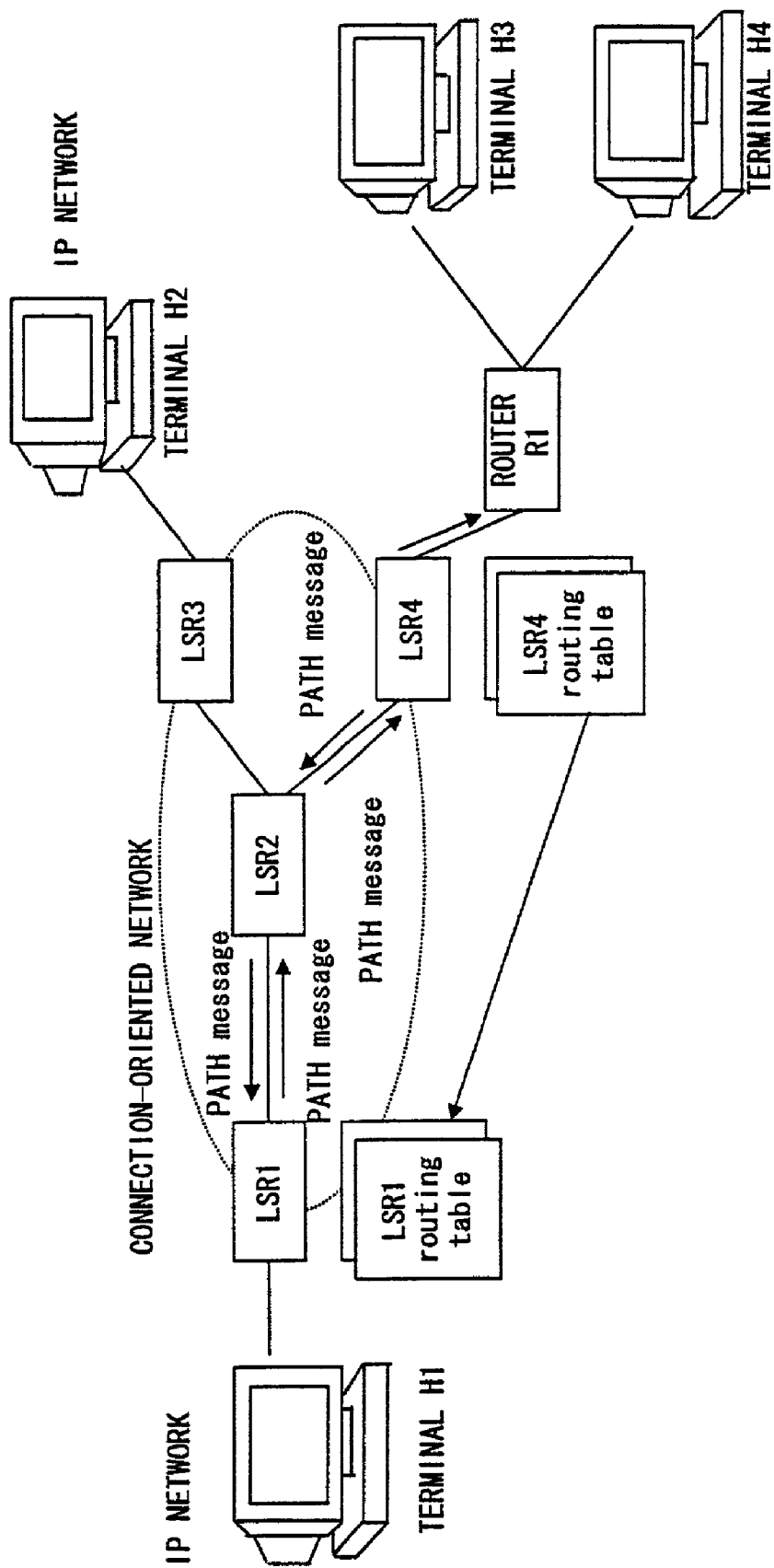
FIG. 23 shows the protocol sequence of this preferred embodiment.

FIG. 23 shows the protocol sequence of this preferred embodiment.

Specifically, if LSR1 wants the routing table of LSR4, LSR1 transmits the PATH message toward LSR4 via LSR2 using a connection protocol. On receipt of the PATH message, LSR4 copies the routing table of a self-device, includes the table in an RESV message and transmits the message to LSR1 via LSR2. In this way, LSR1 can obtain the routing table of LSR4.

According to this method, it becomes necessary to add an object to the connection protocol, which is caused if a connection protocol is used as an additional routing protocol instead of a routing protocol. In realty, an easier method can be adopted. As a routing protocol storing no link information, RIP (Routing Information Protocol) can be considered. This method can be applied to an MPLS network using both RIP and RSVP.

Next, a method for optimizing exit edge device-outside edge device network information in the use of exit edge device routing information is described.

Figure 24:
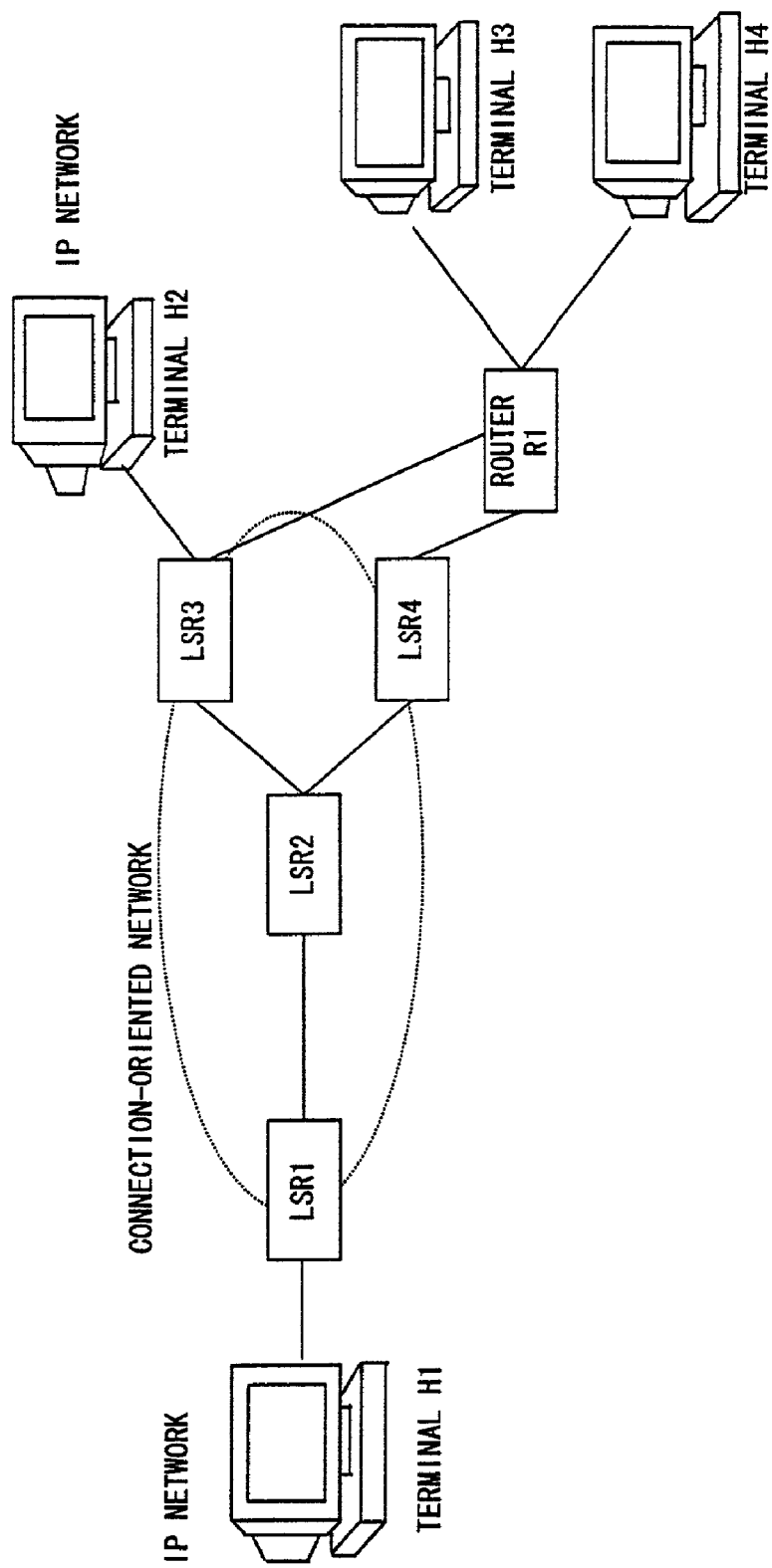
FIG. 24 shows the optimization of routing information.

FIG. 24 shows the optimization of routing information.

In the case where a routing protocol does not store network link information and stores only a routing table, the routing table stored in an exit edge device is transmitted to an entrance edge device using a connection protocol and a label-FEC table is generated based on the information.

According to the method shown in FIGS. 22 and 23, an entrance edge device collects a routing table calculated based on network link information. Therefore, the collected routing information is not always an optimal route information. A means for optimizing a route is needed.

An entrance edge device obtains routing tables from a plurality of exits edge devices. If those tables are compared, there is the possibility that a route passing through a plurality of edge devices, leading to a specific destination viewed by the entrance edge device may be detected. In this case, optimization is performed according to the following algorithm.

(1) The cost of a route passing through LSR1 is calculated.

cost (*i*)=(cost of going from an entrance edge device to *LSRi*)+(cost of going from *LSRi* to a destination)

(2) The minimum of cost (i) (i=all existing routes) is detected.

min[cost(i) (i=all existing routes)]

(3) A route with the detected minimum cost is registered in a label-FEC table.

The network shown in FIG. 24 is studied. As a route from terminal H1 to terminal H3 there are two routes: a route via LSR1, LSR2 and LSR3, and a route via LSR1, LSR2 and LSR4.

Although LSR1 obtains routing tables from both LSR3 and LSR4, both the routing tables have the entries of terminal H3. Therefore, a route H1-LSR1-LSR2-LSR3-R1-H3 and a route H1-LSR1-LSR2-LSR4-R1-H3 are compared and a route with a lower cost is adopted.

In the case of a routing protocol storing no link information, such as RIP, a routing table must be obtained in order to obtain the routing information of an exit edge device. However, since an entrance edge device does not directly obtain the link information of a network, it cannot be verified whether optimal route information is really obtained. This problem is avoided by adopting the optimization method described above.

FEC, described above, is an abbreviation of Forward Equivalent Class. An FEC expresses a flow (data stream generated by a user) corresponding to each connection in the entrance device of an MPLS network. Usually, FECs are stored in an edge device as an FEC table. A flow is a minimum unit for expressing the packet stream of a user, while in an MPLS network an FEC is a minimum unit for handling data flowing through the network. The minimum grain size of an FEC can be a user flow and the maximum can be an exit edge device. Specifically, full data transmitted to a specific exit edge device can be considered to be one FEC.

Speaking of cost, conventionally a cost calculator is usually provided in a routing protocol. There are several algorithms for cost calculation. In the case of the OSPF protocol, a well-known algorithm called "dijkstra" is used. It is assumed that the present invention also uses this algorithm.

FIG. 25 is an example of the label-FEC table stored in an entrance edge device.

The label-FEC table stored in an entrance edge device has a structure, as shown in FIG. 25. There are the same number of tables as that of exit edge devices.

An FEC is basically externally set. Sometimes the FEC is manually written and sometimes an application program provided in an entrance edge device automatically dynamically rewrites the FEC. The FEC designates five items of d.a., s.a., d.p., s.p. and proto at the finest level. For example, in the most popular pattern, d.a. and d.p. are designated in pairs and the others are not designated.

Each connection established in an MPLS network is registered as a label. In an entrance edge device, each flow is related to a connection with heavy traffic in the MPLS network using this table. A sequence showing table generation is as follows.

1. A file is read from an initialized FEC table. In this case, FEC data are initialized for each exit edge device. In this way, the left side of the table shown in FIG. 25 is generated.
2. When a connection is established according to RSVP from an entrance edge device (at first, at the time of system start), labels are sequentially written from the top on the right side of the table.

FIG. 26 shows the hardware configuration of a router required when this preferred embodiment of the present invention is implemented by software.

A router 20 comprises a CPU 25, a memory 24, a storage device 26, an input/output device 27, a plurality of receiving interfaces 21 and a plurality of transmitting interfaces 23.

The CPU 25 stores in the memory 24 packets received by the plurality of receiving interfaces 21 via a bus or switch 22. The CPU 25 receives data from the floppy disk FDD, CD-ROM, memory card, etc., of the input/output device 27, stores in the memory 24 a program stored in a storage device, such as a hard disk, flash memory, etc., and executes the program. By executing this program, the CPU 25 determines a transmitting interface 23 to which a packet received from one of the plurality of receiving interfaces 21 is outputted, reads the packet from the memory 24 and transmits the packet to the transmitting interface 23 via the bus or switch 22. The transmitting interface 23 transmits the packet received from the memory 24 to a line.

Although the program stored in the memory 24 by the CPU 25 in the above description is a program for routing, a program to implement the preferred embodiment described above of the present invention is also simultaneously stored. Therefore, a process for setting L/R bits in the options field of an OSPF packet can also be executed according to the program. A routing tree can also be generated according to the program read from the storage device 24.

In this way, the program to implement the preferred embodiment of the present invention is distributed to each router 20 using an FDD, CD-ROM, memory card, etc., and by installing the program stored in these storage devices, a router can be provided with the functions of the preferred embodiment of the present invention.

Alternatively, an update program can be installed in a conventional router by the input/output device 27 and the function of the router can be extended in order to implement the preferred embodiment of the present invention.

In this way, mapping between a connection-oriented network required to automatically balance load and a connectionless network can be automatically performed in a network.

What is claimed is:

1. A routing information mapping device, comprising:
   a transmitting unit transmitting Open Shortest Path First packets with information in the options field of the packets about whether a self-device belongs to a connection-oriented network;
   a receiving unit extracting information about whether another device from which a packet is received belongs to the connection-oriented network and information about a configuration of a network from the device;
   a tree generation unit generating a routing tree of a network that clearly indicates a device belonging to the connection-oriented network, based on the information extracted by the receiving unit;
   a judgment unit judging whether the self-device is an edge device of the connection-oriented network, based on the routing tree of the network;
   an outside network information acquisition unit obtaining information about an outside network connected to the connection-oriented network from both the routing tree and information about the edge device of the connection-oriented network; and
   a mapping unit generating a table for relating routing information of the connection-oriented network to routing information of the outside network connected to the self-device if the self-device is the edge device,
   wherein when the outside network is connectionless network, if the packet is inputted to the self-device from the outside network the table has a blank entry in a field of input connection identifier and if the packet is outputted from the self-device to the outside network the table has a blank entry in a field of output connection identifier.

2. The routing information mapping device according to claim 1, wherein
   said transmitting unit attaches information about a connection protocol used by the self-device to the packet and transmits the information.

3. The routing information mapping device according to claim 1, comprising:
   a server unit receiving both information about a configuration of the network and information about whether the self-device belongs to the connection-oriented network from each device and transmitting both the information about the configuration of the network and information about whether each device belongs to the connection-oriented network to a requesting device at a request of each device.

4. The routing information mapping device according to claim 3, wherein
   said sever unit receives information about a connection protocol used by each device from each device, stores the information and transmits the information to the requesting device at the request of each device.

5. The routing information mapping device according to claim 1, wherein the packet is transmitted/received using a routing protocol.

6. The routing information mapping device according to claim 1, wherein the packet is transmitted/received using a connection protocol.

7. The routing information mapping device according to claim 1, wherein the table for relating routing information of the connection-oriented network to routing information of the outside network connected to the self-device that is transmitted from another device is used in the self-device as routing information.

8. The routing information mapping device according to claim 7, wherein if the tables are obtained from the plurality of other devices, a cost of a route of the network from which the table is obtained is calculated and the table transmitted via the route with an optimal cost is used.

9. A routing information mapping method, comprising:
   (a) transmitting an Open Shortest Path First packet with information in the options field of the packet about whether a self-device belongs to a connection-oriented network;
   (b) extracting both information about whether another device from which a packet is received belongs to the connection-oriented network and information about a configuration of a network from the other device;

(c) generating a routing tree of the network that clearly indicates a device belonging to the connection-oriented network, based on the information extracted in step (b);

(d) judging whether the self-device is an edge device of the connection-oriented network, based on the routing tree of the network;

(e) obtaining information about an outside network connected to the connection-oriented network from both the routing tree and information about the edge device of the connection-oriented network; and (f) generating a table for relating routing information of the connection-oriented network to routing information of the outside network connected to the self-device if the self-device is the edge device, wherein when the outside network is connectionless network, if the packet is inputted to the self-device from the outside network the table has a blank entry in a field of input connection identifier and if the packet is outputted from the self-device to the outside network the table has a blank entry in a field of output connection identifier.

10. The routing information mapping method according to claim 9, wherein in step (a), information about a connection protocol used by the self-device is attached to the packet and is transmitted.

11. The routing information mapping method according to claim 9, further comprising:

(g) receiving both information about the configuration of the network and information about whether the self-device belongs to the connection-oriented network from each device, storing the obtained information and transmitting both the information about the configuration of the network and information about whether each device belongs to the connection-oriented network to a requesting device at a request of each device.

12. The routing information-mapping method according to claim 11, wherein in step (g), information about a connection protocol used by each device is received from each device, the information is stored and the information is transmitted to the requesting device at the request of each device.

13. The routing information mapping method according to claim 9, wherein the packet is transmitted/received using a routing packet.

14. The routing information mapping method according to claim 9, wherein the packet is transmitted/received using a connection packet.

15. The routing information mapping method according to claim 9, wherein the table for relating routing information of the connection-oriented network to routing information of the outside network connected to the self-device that is transmitted from another device is used in the self-device as routing information.

16. The routing information mapping method according to claim 15, wherein if the tables are obtained from the plurality of other devices, a cost of a route of the network from which the table is obtained is calculated and the table transmitted via a route with an optimal cost is used.

17. A storage medium on which is recorded a program for enabling a processor to execute routing information mapping, said process comprising:

(a) transmitting an Open Shortest Path First packet with information in the options field of the packet about whether a self-device belongs to a connection-oriented network;

(b) extracting both information about whether another device from which a packet is received belongs to the connection-oriented network and information about a configuration of the network from the device;

(c) generating a routing tree of the network that clearly indicates the device belonging to the connection-oriented network, based on the information extracted in step (b);

(d) judging whether the self-device is an edge device of the connection-oriented network, based on the routing tree of the network;

(e) obtaining information about an outside network connected to the connection-oriented network from both the routing tree and information about the edge device of the connection-oriented network; and (f) generating a table for relating routing information of the connection-oriented network to routing information of the outside network connected to the self-device if the self-device is the edge device, wherein when the outside network is connectionless network, if the packet is inputted to the self-device from the outside network the table has a blank entry in a field of input connection identifier and if the packet is outputted from the self-device to the outside network the table has a blank entry in a field of output connection identifier.

18. The storage medium according to claim 17, wherein in step (a), information about a connection protocol used by the self-device is attached to the packet and is transmitted.

19. The storage medium according to claim 17, said process further comprising:

(g) receiving both information about the configuration of the network and information about whether the self-device belongs to a connection-oriented network from each device, storing the obtained information and transmitting both the information about the configuration of the network and information about whether each device belongs to the connection-oriented network to a requesting device at a request of each device.

20. The storage medium according to claim 19, wherein in step (g), information about a connection protocol used by each device is received from each device, the information is stored and the information is transmitted to the requesting device at the request of each device.

21. The storage medium according to claim 17, wherein the packet is transmitted/received using a routing packet.

22. The storage medium according to claim 17, wherein the packet is transmitted/received using a connection packet.

23. The storage medium according to claim 17, wherein a table for relating routing information of the connection-oriented network to routing information of an outside network connected to the self-device that is transmitted from another device is used in the self-device as routing information.

24. The storage medium according to claim 17, wherein if a plurality of tables are obtained from the plurality of other devices, a cost of a route of the network from which the table is obtained is calculated and the table transmitted via the route with an optimal cost is used.

* * * * *